US009215098B2

(12) United States Patent
Pan

(10) Patent No.: US 9,215,098 B2
(45) **Date of Patent: *Dec. 15, 2015**

(54) SYSTEM AND METHOD TO CONTROL WIRELESS COMMUNICATIONS

(71) Applicant: Lemko Corporation, Itasca, IL (US)

(72) Inventor: Shaowei Pan, Kildeer, IL (US)

(73) Assignee: Lemko Corporation, Itasca, IL (US)

( * ) Notice: Subject to any disclaimer, the term of this patent is extended or adjusted under 35 U.S.C. 154(b) by 291 days.

This patent is subject to a terminal disclaimer.

(21) Appl. No.: 13/682,252

(22) Filed: Nov. 20, 2012

(65) Prior Publication Data

US 2013/0148578 A1 Jun. 13, 2013

Related U.S. Application Data

(63) Continuation of application No. 12/146,618, filed on Jun. 26, 2008, now Pat. No. 8,340,667.

(51) Int. Cl.
*H04W 40/00* (2009.01)
*H04L 12/66* (2006.01)

(52) U.S. Cl.
CPC ...................................... *H04L 12/66* (2013.01)

(58) Field of Classification Search
CPC ................................ H04W 88/18; H04W 4/06
USPC ........... 455/435.1, 435.2, 411, 445, 408, 433, 455/66.1, 519; 370/352, 238, 401
See application file for complete search history.

(56) References Cited

U.S. PATENT DOCUMENTS 4,284,848 A 8/1981 Frost
5,590,175 A 12/1996 Gallant et al.
(Continued)

FOREIGN PATENT DOCUMENTS

CN 1120768 A 4/1996
CN 1214602 A 4/1999
(Continued)

OTHER PUBLICATIONS

Hoffpauir et al., United States Statutory Invention Registration No. H1,918; Entitled "Integrated Authentication Center and Method for Authentication in a Wireless Telecommunications Network"; Filed Feb. 19, 1998; Published Nov. 7, 2000; 19 Pages.
(Continued)

*Primary Examiner* — Kiet Doan
(74) *Attorney, Agent, or Firm* — Toler Law Group, P.C.

(57) ABSTRACT

Methods and systems to control wireless communications are provided. A particular network communication system includes a plurality of distributed mobile architecture gateways. Each distributed mobile architecture gateway includes at least one interface to communicate with one or more legacy communication networks and each distributed mobile architecture gateway also includes a data network connection. The data network connection is adapted to connect to at least one other distributed mobile architecture gateway of the plurality of distributed mobile architecture gateways. Additionally, the system includes a private Internet Protocol (IP) network connecting each distributed mobile architecture gateway to a respective set of distributed mobile architecture (DMA) servers. Each DMA server is coupled to a respective base transceiver station, and the private IP network also connects each DMA server in a particular set of DMA servers to the DMA servers in the other sets of DMA servers.

20 Claims, 14 Drawing Sheets

(56) References Cited

U.S. PATENT DOCUMENTS

| | | | | |
|---|---|---|---|---|
| 5,623,495 | A | 4/1997 | Eng et al. | |
| 5,623,532 | A | 4/1997 | Houde et al. | |
| 5,713,073 | A | 1/1998 | Warsta | |
| 5,734,979 | A | 3/1998 | Lu et al. | |
| 5,890,064 | A | 3/1999 | Widergen et al. | |
| 5,933,784 | A | 8/1999 | Gallagher et al. | |
| 5,991,639 | A | 11/1999 | Rautiola et al. | |
| 6,122,499 | A | 9/2000 | Magnusson | |
| 6,131,038 | A | 10/2000 | Sekine et al. | |
| 6,141,564 | A | 10/2000 | Bruner et al. | |
| H1918 | H | 11/2000 | Hoffpauir et al. | |
| 6,160,804 | A | 12/2000 | Ahmed et al. | |
| 6,411,825 | B1 | 6/2002 | Csapo et al. | |
| 6,418,308 | B1 | 7/2002 | Heinonen et al. | |
| 6,421,325 | B1 | 7/2002 | Kikinis | |
| 6,480,431 | B1 | 11/2002 | Hidaka | |
| 6,515,985 | B2 | 2/2003 | Shmulevich et al. | |
| 6,539,237 | B1 | 3/2003 | Sayers et al. | |
| 6,542,497 | B1 | 4/2003 | Curry et al. | |
| 6,549,937 | B1 | 4/2003 | Auerbach et al. | |
| 6,584,098 | B1 | 6/2003 | Dutnall | |
| 6,611,533 | B1 | 8/2003 | Liao et al. | |
| 6,614,784 | B1 | 9/2003 | Glitho et al. | |
| 6,631,260 | B1 | 10/2003 | Carey et al. | |
| 6,647,426 | B2 | 11/2003 | Mohammed | |
| 6,678,155 | B1 | 1/2004 | Bresniker | |
| 6,694,134 | B1 | 2/2004 | Lu et al. | |
| 6,697,355 | B1 | 2/2004 | Lim | |
| 6,704,409 | B1 | 3/2004 | Dilip et al. | |
| 6,731,932 | B1 | 5/2004 | Rune et al. | |
| 6,735,184 | B1 | 5/2004 | Davidson et al. | |
| 6,751,207 | B1 | 6/2004 | Lee et al. | |
| 6,760,325 | B1 | 7/2004 | Hameleers et al. | |
| 6,763,226 | B1 | 7/2004 | McZeal, Jr. | |
| 6,763,233 | B2 | 7/2004 | Bharatia | |
| 6,791,988 | B1 | 9/2004 | Hameleers | |
| 6,795,444 | B1 | 9/2004 | Vo et al. | |
| 6,807,431 | B2 | 10/2004 | Sayers et al. | |
| 6,807,432 | B2 | 10/2004 | Hwang | |
| 6,816,706 | B1 | 11/2004 | Hohnstein et al. | |
| 6,819,652 | B1 | 11/2004 | Akhtar et al. | |
| 6,829,473 | B2 | 12/2004 | Raman et al. | |
| 6,831,903 | B2 | 12/2004 | Kang | |
| 6,839,356 | B2 | 1/2005 | Barany et al. | |
| 6,859,652 | B2 | 2/2005 | Karabinis et al. | |
| 6,871,072 | B1 | 3/2005 | Meche | |
| 6,879,582 | B1 | 4/2005 | Dhara et al. | |
| 6,879,677 | B2 | 4/2005 | Trandal et al. | |
| 6,917,813 | B2 | 7/2005 | Elizondo | |
| 6,937,708 | B2 | 8/2005 | Hirose | |
| 6,958,983 | B2 | 10/2005 | Musikka et al. | |
| 6,985,454 | B1 | 1/2006 | Wiedeman et al. | |
| 7,003,286 | B2 | 2/2006 | Brown et al. | |
| 7,050,414 | B2 | 5/2006 | Lin | |
| 7,054,307 | B2 | 5/2006 | Papadimitriou et al. | |
| 7,054,322 | B2 | 5/2006 | D'Annunzio et al. | |
| 7,072,650 | B2 | 7/2006 | Stanforth | |
| 7,117,015 | B2 | 10/2006 | Scheinert et al. | |
| 7,120,435 | B2 | 10/2006 | Usher et al. | |
| 7,120,436 | B2 | 10/2006 | Kim | |
| 7,133,670 | B1 | 11/2006 | Moll et al. | |
| 7,133,923 | B2 | 11/2006 | MeLampy et al. | |
| 7,136,651 | B2 | 11/2006 | Kalavade | |
| 7,154,901 | B2 | 12/2006 | Chava et al. | |
| 7,158,621 | B2 | 1/2007 | Bayne | |
| 7,171,216 | B1 | 1/2007 | Choksi | |
| 7,299,039 | B2 | 11/2007 | Lee et al. | |
| 7,313,399 | B2 | 12/2007 | Rhee et al. | |
| 7,324,478 | B2 | 1/2008 | Park et al. | |
| 7,328,268 | B1 | 2/2008 | Foltak et al. | |
| 7,345,997 | B2 | 3/2008 | Kim | |
| 7,346,334 | B2 | 3/2008 | Gaeta et al. | |
| 7,349,412 | B1 | 3/2008 | Jones et al. | |
| 7,359,700 | B2 | 4/2008 | Swenson et al. | |
| 7,383,042 | B2 | 6/2008 | Lamb et al. | |
| 7,385,947 | B2 | 6/2008 | Wu et al. | |
| 7,406,069 | B2 | 7/2008 | Yashar et al. | |
| 7,424,313 | B2 | 9/2008 | Ham et al. | |
| 7,486,967 | B2 | 2/2009 | Pan et al. | |
| 7,490,132 | B1 | 2/2009 | Lyle et al. | |
| 7,522,632 | B2 | 4/2009 | La Porta et al. | |
| 7,536,170 | B2 | 5/2009 | Goldman et al. | |
| 7,539,158 | B2 | 5/2009 | Pan | |
| 7,548,763 | B2 | 6/2009 | Pan | |
| 7,552,670 | B2 | 6/2009 | Goldman et al. | |
| 7,606,594 | B2 | 10/2009 | Jesse et al. | |
| 7,653,414 | B2 | 1/2010 | Pan | |
| 7,738,488 | B2 | 6/2010 | Marisco et al. | |
| 7,760,695 | B2 | 7/2010 | Gopalakrishnan et al. | |
| 7,787,879 | B1 | 8/2010 | Philips et al. | |
| 7,840,230 | B2 | 11/2010 | Pan | |
| 7,855,988 | B2 | 12/2010 | Pan | |
| 7,856,233 | B2 | 12/2010 | Pan | |
| 7,979,066 | B2 | 7/2011 | Pan | |
| 8,018,907 | B2 | 9/2011 | Kubler et al. | |
| 8,036,158 | B2 | 10/2011 | Pan et al. | |
| 8,046,420 | B2 | 10/2011 | Pan | |
| 8,086,536 | B2 | 12/2011 | Dublish et al. | |
| 8,089,920 | B2 | 1/2012 | Pan | |
| 8,107,409 | B2 | 1/2012 | Pan | |
| 8,213,909 | B2 | 7/2012 | Lee et al. | |
| 8,224,322 | B2 | 7/2012 | Pan | |
| 8,310,990 | B2 | 11/2012 | Pan | |
| 8,351,420 | B2 | 1/2013 | Linkola et al. | |
| 8,359,029 | B2 | 1/2013 | Pan | |
| 8,676,155 | B2 | 3/2014 | Fan et al. | |
| 8,717,009 | B2 | 5/2014 | Tu | |
| 2001/0013050 | A1 | 8/2001 | Shah | |
| 2001/0036173 | A1 | 11/2001 | Shmulevich et al. | |
| 2001/0046859 | A1 | 11/2001 | Kil | |
| 2001/0055298 | A1 | 12/2001 | Baker et al. | |
| 2002/0009060 | A1 | 1/2002 | Gross | |
| 2002/0015392 | A1 | 2/2002 | Musikka et al. | |
| 2002/0016180 | A1 | 2/2002 | Derosier et al. | |
| 2010/0048208 | A9 | 2/2002 | Gunaratnam et al. | |
| 2002/0045444 | A1 | 4/2002 | Usher et al. | |
| 2002/0051518 | A1 | 5/2002 | Bondy et al. | |
| 2002/0058502 | A1 | 5/2002 | Stanforth | |
| 2002/0061746 | A1 | 5/2002 | Jo et al. | |
| 2002/0160772 | A1 | 10/2002 | Gailey et al. | |
| 2002/0169887 | A1 | 11/2002 | MeLampy et al. | |
| 2003/0048766 | A1 | 3/2003 | D'Annunzio et al. | |
| 2003/0063721 | A1 | 4/2003 | Hirose | |
| 2003/0088698 | A1 | 5/2003 | Singh et al. | |
| 2003/0092441 | A1 | 5/2003 | Taha et al. | |
| 2003/0096628 | A1 | 5/2003 | Bar-On et al. | |
| 2003/0100302 | A1 | 5/2003 | Armbruster et al. | |
| 2003/0100342 | A1 | 5/2003 | Ham et al. | |
| 2003/0112748 | A1 | 6/2003 | Puppa et al. | |
| 2003/0153343 | A1 | 8/2003 | Crockett et al. | |
| 2003/0154306 | A1 * | 8/2003 | Perry | 709/245 |
| 2003/0186694 | A1 | 10/2003 | Sayers et al. | |
| 2003/0198325 | A1 | 10/2003 | Bayne | |
| 2004/0014466 | A1 | 1/2004 | Jesse et al. | |
| 2004/0018829 | A1 | 1/2004 | Raman et al. | |
| 2004/0019539 | A1 | 1/2004 | Raman et al. | |
| 2004/0156495 | A1 | 8/2004 | Chava et al. | |
| 2004/0203621 | A1 | 10/2004 | Brown et al. | |
| 2004/0203677 | A1 | 10/2004 | Brown et al. | |
| 2004/0204097 | A1 | 10/2004 | Scheinert et al. | |
| 2004/0253949 | A1 | 12/2004 | Swensen et al. | |
| 2004/0253984 | A1 | 12/2004 | Csapo et al. | |
| 2004/0259556 | A1 | 12/2004 | Czys | |
| 2005/0044152 | A1 | 2/2005 | Hardy et al. | |
| 2005/0064922 | A1 | 3/2005 | Owens et al. | |
| 2005/0070278 | A1 | 3/2005 | Jiang | |
| 2005/0075106 | A1 | 4/2005 | Jiang | |
| 2005/0091392 | A1 | 4/2005 | Gesswein et al. | |
| 2005/0176413 | A1 | 8/2005 | Lee et al. | |
| 2005/0220054 | A1 | 10/2005 | Meier et al. | |
| 2005/0249176 | A1 | 11/2005 | O'Neil et al. | |
| 2005/0250491 | A1 | 11/2005 | Roy et al. | |
| 2006/0026252 | A1 | 2/2006 | Caspi et al. | |
| 2006/0046714 | A1 | 3/2006 | Kalavade | |

(56) References Cited

U.S. PATENT DOCUMENTS

| | | | | |
|---|---|---|---|---|
| 2006/0046760 | A1 | 3/2006 | Bertino et al. | |
| 2006/0047836 | A1 | 3/2006 | Rao et al. | |
| 2006/0052113 | A1 | 3/2006 | Ophir et al. | |
| 2006/0063544 | A1 | 3/2006 | Zhao et al. | |
| 2006/0098661 | A1 | 5/2006 | Pan | |
| 2006/0114934 | A1 | 6/2006 | Shin et al. | |
| 2006/0141984 | A1 | 6/2006 | Taglienti et al. | |
| 2006/0142011 | A1 | 6/2006 | Kallio | |
| 2006/0148465 | A1 | 7/2006 | Perdomo et al. | |
| 2006/0159039 | A1 | 7/2006 | Jung et al. | |
| 2006/0203746 | A1 | 9/2006 | Maggenti et al. | |
| 2006/0217121 | A1 | 9/2006 | Soliman et al. | |
| 2006/0221912 | A1 | 10/2006 | Olivier et al. | |
| 2006/0234747 | A1 | 10/2006 | Pan | |
| 2006/0234774 | A1 | 10/2006 | Pan et al. | |
| 2006/0258358 | A1 | 11/2006 | Kallio | |
| 2007/0008968 | A1 | 1/2007 | Baker et al. | |
| 2007/0010245 | A1 | 1/2007 | Levitan | |
| 2007/0021097 | A1 | 1/2007 | Gaeta et al. | |
| 2007/0021118 | A1 | 1/2007 | Ophir | |
| 2007/0060124 | A1 | 3/2007 | Kalavade | |
| 2007/0076697 | A1 | 4/2007 | Huotari et al. | |
| 2007/0082684 | A1 | 4/2007 | Rozenstrauch et al. | |
| 2007/0087738 | A1 | 4/2007 | Melkesetian | |
| 2007/0127423 | A1 | 6/2007 | Ho | |
| 2007/0147598 | A1 | 6/2007 | Somes et al. | |
| 2007/0197215 | A1 | 8/2007 | Ben-Yehuda et al. | |
| 2007/0202847 | A1 | 8/2007 | Pan | |
| 2007/0213075 | A1 | 9/2007 | Jiang | |
| 2007/0230352 | A1 | 10/2007 | Kokku et al. | |
| 2007/0232267 | A1 | 10/2007 | Pan | |
| 2007/0232304 | A1 | 10/2007 | Goldman et al. | |
| 2007/0234892 | A1 | 10/2007 | Goldman et al. | |
| 2007/0243891 | A1 | 10/2007 | Civanlar et al. | |
| 2007/0271606 | A1 | 11/2007 | Amann et al. | |
| 2007/0287452 | A1 | 12/2007 | Pan | |
| 2007/0291910 | A1 | 12/2007 | Bucchieri et al. | |
| 2007/0293216 | A1 | 12/2007 | Jiang | |
| 2008/0013531 | A1* | 1/2008 | Elliott et al. | 370/356 |
| 2008/0039144 | A1 | 2/2008 | Pan et al. | |
| 2008/0080438 | A1 | 4/2008 | Gopalakrishnan et al. | |
| 2008/0101314 | A1 | 5/2008 | Bachmutsky | |
| 2008/0101410 | A1 | 5/2008 | Barkley et al. | |
| 2008/0134295 | A1 | 6/2008 | Bailey et al. | |
| 2008/0146158 | A1 | 6/2008 | Pan | |
| 2008/0160997 | A1 | 7/2008 | Kim | |
| 2008/0168523 | A1 | 7/2008 | Ansari et al. | |
| 2008/0244014 | A1 | 10/2008 | Britton et al. | |
| 2008/0261580 | A1 | 10/2008 | Wallentin et al. | |
| 2009/0003269 | A1 | 1/2009 | Kumazawa et al. | |
| 2009/0022155 | A1 | 1/2009 | Rosenberg et al. | |
| 2009/0031244 | A1 | 1/2009 | Brezina et al. | |
| 2009/0067441 | A1 | 3/2009 | Ansari et al. | |
| 2009/0156213 | A1 | 6/2009 | Spinelli et al. | |
| 2009/0186626 | A1 | 7/2009 | Raghothaman | |
| 2009/0215449 | A1 | 8/2009 | Avner | |
| 2009/0227230 | A1 | 9/2009 | Camilleri et al. | |
| 2009/0227235 | A1 | 9/2009 | Pan | |
| 2009/0228555 | A1 | 9/2009 | Joviak et al. | |
| 2009/0270097 | A1 | 10/2009 | Gallagher et al. | |
| 2009/0271491 | A1 | 10/2009 | Pan | |
| 2009/0292785 | A1 | 11/2009 | Leedberg et al. | |
| 2009/0325584 | A1 | 12/2009 | Pan | |
| 2009/0327819 | A1 | 12/2009 | Pan | |
| 2010/0008306 | A1 | 1/2010 | Pan | |
| 2010/0008369 | A1 | 1/2010 | Pan | |
| 2010/0048197 | A1 | 2/2010 | Jiang | |
| 2010/0057485 | A1 | 3/2010 | Luft | |
| 2010/0057732 | A1 | 3/2010 | O'Sullivan et al. | |
| 2010/0075668 | A1 | 3/2010 | Pan | |
| 2010/0080214 | A1 | 4/2010 | Li et al. | |
| 2010/0094878 | A1 | 4/2010 | Soroca et al. | |
| 2010/0199340 | A1 | 8/2010 | Jonas et al. | |
| 2010/0217809 | A1 | 8/2010 | Vymenets et al. | |
| 2010/0217837 | A1 | 8/2010 | Ansari et al. | |
| 2011/0059740 | A1 | 3/2011 | Pan | |
| 2011/0060853 | A1 | 3/2011 | Pan | |
| 2011/0223921 | A1 | 9/2011 | Pan | |
| 2011/0320576 | A1 | 12/2011 | Lauer et al. | |
| 2012/0002607 | A1 | 1/2012 | Pan | |
| 2012/0020293 | A1 | 1/2012 | Nix, Jr. et al. | |
| 2012/0044908 | A1 | 2/2012 | Spinelli et al. | |
| 2012/0094659 | A1 | 4/2012 | Pan | |
| 2012/0106454 | A1 | 5/2012 | Pan | |
| 2012/0224586 | A1 | 9/2012 | Nag et al. | |
| 2012/0252444 | A1 | 10/2012 | Pan | |
| 2012/0324041 | A1 | 12/2012 | Gerber et al. | |
| 2013/0039279 | A1 | 2/2013 | Pan | |
| 2013/0130677 | A1 | 5/2013 | Pan | |
| 2015/0081812 | A1 | 3/2015 | Davies et al. | |

FOREIGN PATENT DOCUMENTS

| | | | |
|---|---|---|---|
| CN | 1269656 | A | 10/2000 |
| CN | 1427637 | A | 7/2003 |
| CN | 1538781 | A | 10/2004 |
| CN | 101044769 | A | 9/2007 |
| EP | 0365885 | | 5/1990 |
| WO | 0028752 | A1 | 5/2000 |
| WO | 2004043092 | A1 | 5/2004 |
| WO | 2007102003 | A1 | 9/2007 |

OTHER PUBLICATIONS

B.G. Evans and K. Baughan; "Visions of 4G"; Electronics & Communication Engineering Journal; Dec. 2000; pp. 293-303.

Shirshanka Das, Alok Nandan & Giovanni Pau (University of CA, Los Angeles, CA, USA); "Spawn: A Swarming Protocol for Vehicular Ad-Hoc Wireless Networks"; VANET'04, Oct. 1, 2004, Philadelphia, PA, USA; ACM 1-58113-922-5/04/0010; 2 pgs.

Yu-Chee Tseng, Chia-Ching Shen (National Chiao Tung University) & Wen-Tsuen Chen (National Tsing Hua University); "Integrating Mobile IP with AD Hoc Networks"; IEEE Computer Society; 0018-9162/03; 2003 IEEE; May 2003; pp. 48-55.

Halim Yanikomeroglu, David D. Falconer & Van M. Sreng; "Coverage Enhancement Through Two-Hop Peer-to-Peer Relaying in Cellular Radio Networks"; Broadband Communications and Wireless Systems (BCWS) Centre Department of Systems & Computer Engineering, Carleton University, Ottawa, Canada; WWRF Meeting #7, Eindhoven, the Netherlands, Dec. 3-4, 2002, WG4: Spectrum, New Air Interfaces and Ad-Hoc Networking Multi-Hop Wireless Systems; 10 pages.

Bur Goode; "Voice Over Internet Protocol (VoIP)"; 0018-9219/02 2002 IEEE; Proceedings of the IEEE; vol. 90, No. 9, Sep. 2002; pp. 1495-1517.

Kyung-Hyu Lee, Kyu-Ok Lee & Kwon-Chul Park (Network Research Laboratory ETRI Korea) Jong-Ok Lee and Yoon-Hak Bang (Network Planning Team KT Korea); "Architecture to be Deployed on Strategies of Next-Generation Networks"; 0-7803-7802-4/03 2003 IEEE; pp. 819-822.

Wolfgang Kellerer, Christian Bettstetter, Christian Schwingenschlögl & Peter Sties (Technische Universität München) Karl-Ernst Steinberg (BMW) & Hans-Jörg Vögel (the Fantastic Corp); "(Auto) Mobile Communication in a Heterogeneous and Converged World"; IEEE Personal Communications; Dec. 2001; 1070-9916/01; 2001 IEEE pp. 41-47.

Nilanjan Banerjee & Sajal K. Das (University of Texas, Arlington) & Arup Acharya (IBM T.J. Watson Research Center) "Peer-to-peer SIP-based Services over Wireless Ad Hoc Networks"; Broadwim: Broadband Wireless Multimedia Workshop; Oct. 29, 2004—broadnets.org; *This work was supported by NSF under the ORBIT testbed project, grant # NSF NRT Project #ANI-0335244 and by NSF ITR grant IIS-0326505; 8 pages.

Hung-Yu Wei (Columbia University) & Richard D. Gitlin (NEC Laboratories America); "Two-Hop-Relay Architecture for Next-Generation WWAN/WLAN Integration"; 4G Mobile Communications: Toward Open Wireless Architecture; 1536-1284/04 2004 IEEE; IEEE Wireless Communications; Apr. 2004; pp. 2-9.

Wolfgang Kellerer (LKN, Munich University of Technology), Hans-Jörg Vögel (the Fantastic Corp.) & Karl-Ernst Steinberg (BMW); "A

(56) References Cited

OTHER PUBLICATIONS

Communication Gateway for Infrastructure Independent Wireless Access"; IEEE Communications Magazine; Mar. 2002; vol. 9; No. 3; 6 pages.
Willie W. Lu & Jenny Hu (U.S. Center for Wireless Communications, Stanford University, CA); "Open Wireless Architecture—The Core to 4G Mobile Communications"; China Communications; Apr. 2006; pp. 32-39.
Ralf Pabst, Bernard H. Walke & Daniel C. Schultz (RWTH Aachen University) Patrick Herhold & Gerhard P. Fettweis (Technical University of Dresden) Halim Yanikomeroglu & David D. Falconer (Carleton University) Sayandev Mukherjee & Harish Viswanathan (Lucent Technologies) Matthias Lott & Wolfgang Zirwas (Siemens ICM) Mischa Dohler & Hamid Aghvami (Kings College); "Relay-Based Deployment Concepts for Wireless and Mobile Broadband Radio"; 0163-6804/04; 2004 IEEE; IEEE Communications Magazine; Sep. 2004; pp. 80-89.
Simone Frattasi, Hanane Fathi, Frank H.P. Fitzek & Ramjee Prasad (Aalborg University) Marcos D. Katz (Samsung Electronics); "Defining 4G Technology from the User's Perspective"; IEEE Network; Jan./Feb. 2006; 0890-8044/06; 2006 IEEE; pp. 35-41.
Ian F. Akyildiz (Broadband and Wireless Networking BWN Lab, Georgia Institute of Technology) Xudong Wang & Weilin Wang (Kiyon, Inc. La Jolla, CA); "Wireless Mesh Networks: A Survey"; Computer Networks 47; Jan. 1, 2005; pp. 445-487; 1389-1286 2004 Elsevier B.V.
Brian Woerner (Virginia Tech, Blacksburg, VA) & Mostofa Howlader (University of Tennessee, Knoxville, TN); "Research Directions for Fourth Generation Wireless"; Proceedings of the 10th IEEE International Workshops on Enabling Technologies: Infrastructure for Collaborative Enterprises (WETICE 2001); Jun. 20-22, 2001; Cambridge, MA, USA; IEEE Computer Society 2001; ISBN 0-7695-1269-0; 2 pages.
"Framework and Overall Objectives of the Future Development of IMT-2000 and Systems Beyond IMT-2000"; International Telecommunication Union; ITU-R Radiocommunication Sector of ITU; Recommendation ITU-R M.1645 (Jun. 2003); M Series; Mobile, Radiodetermination, Amateur and Related Satellite Services; 26 pages.
Restriction Requirement for U.S. Appl. No. 12/146,618 mailed Sep. 14, 2011, 7 pages.
Non-Final Office Action for U.S. Appl. No. 12/146,618 mailed Nov. 2, 2011, 29 pages.
Final Office Action for U.S. Appl. No. 12/146,618 mailed Apr. 27, 2012, 15 pages.
Notice of Allowance and Fee(s) Due for U.S. Appl. No. 12/146,618 mailed Aug. 21, 2012, 23 pages.
International Search Report and Written Opinion received in corresponding PCT Application No. PCT/US2009/045951 from the International Searching Authority (KR) mailed Dec. 30, 2009, 12 pages.
Extended European Search Report for European Application No. 05801092.7-1525/1810465, PCT/US05/035648 mailed Jan. 31, 2011, 72 pages.
Notification of the First Office Action for United Kingdom Application No. GB0706179.9 mailed Sep. 18, 2008, 3 pages.
First Examination Report for Indian Application No. 469/MUMNP/2007, dated Mar. 30, 2013, 3 pages.
International Report on Patentability and Written Opinion of the International Search Authority for International Application No. PCT/US05/35648 from the International Searching Authority, mailed on Aug. 24, 2006, 8 pages.
Notification of First Office Action for Chinese Application No. 200980121864.6, mailed on Mar. 6, 2013, 7 pages.
International Search Report and Written Opinion of the International Search Authority for International Application No. PCT/US09/045957 from the International Searching Authority, mailed on Jan. 14, 2010, 8 pages.
International Search Report and Written Opinion of the International Search Authority for International Application No. PCT/US09/045968 from the International Searching Authority, mailed on Jan. 21, 2010, 9 pages.
International Search Report and Written Opinion of the International Search Authority for International Application No. PCT/US09/045973 from the International Searching Authority, mailed on Jan. 18, 2010, 10 pages.
Yu, W. et al., Abstract of "Reverse Link Capacity Analysis on Distributed Wireless Communication System", Journal of Beijing University of Posts and Telecommunications, 2004, Issue 3, Retrieved from <<http://en.cnki.com/article_en/CJFDTOTAL-BJYD200403020.htm>>, 3 pages.
First Office Action issued by the Chinese Patent Office dated Feb. 28, 2015 for Chinese Application No. 201310086483.7 ,, 19 pp.
First Office Action issued by the Chinese Patent Office for Chinese Application No. 201310086471.04 dated Mar. 24, 2015, 17 pp.
Notification of the First Office Action for CN Application No. 201310086513.4, mailed Jun. 5, 2015, 15 pp.

* cited by examiner

Community DMA Server Register

540

| DMAGs | Home DMA Register | Visitor DMA Register | HLRs | VLRs |
|---|---|---|---|---|
| DMAG 1 | Home DMA Server Register of DMAG 1 | Visitor DMA Server Register of DMAG 1 | HLRs of DMAs of DMAG 1 | VLRs of DMAs of DMAG 1 |
| DMAG 2 | Home DMA Server Register of DMAG 2 | Visitor DMA Server Register of DMAG 2 | HLRs of DMAs of DMAG 2 | VLRs of DMAs of DMAG 2 |
| DMAG 3 | Home DMA Server Register of DMAG 3 | Visitor DMA Server Register of DMAG 3 | HLRs of DMAs of DMAG 3 | VLRs of DMAs of DMAG 3 |

SYSTEM AND METHOD TO CONTROL WIRELESS COMMUNICATIONS

CLAIM OF PRIORITY

The present application claims priority from and is a continuation of U.S. patent application Ser. No. 12/146,618, filed on Jun. 26, 2008 and entitled "SYSTEM AND METHOD TO CONTROL WIRELESS COMMUNICATIONS," the contents of which are expressly incorporated herein by reference in their entirety.

FIELD OF THE DISCLOSURE

The present disclosure relates generally to controlling wireless communications.

BACKGROUND

Access to basic telephony service is particularly important for rural and isolated communities. Telephony access allows small-scale enterprises, cooperatives, and farmers to obtain accurate information on fair prices for their products and to access regional and national markets. Access also reduces the cost of transportation and supports the local tourist industry. By bringing markets to people via telecommunications, rather than forcing people to leave in search of markets, urban migration is reduced and greater income and employment potential are generated in rural areas.

Unfortunately, the last decade of the telecommunications boom has not alleviated the disparities between urban and rural communities. The average imbalance, in terms of telephone penetration, in Asia, for example, is over ten to one and is often as high as twenty to 1.2. This means that a country whose urban markets have a penetration of four (4) telephone lines per one-hundred (100) inhabitants, e.g., India and Pakistan, has a rural penetration of less than 0.2 per one-hundred (100). The situation is more acute in most African countries and in some parts of Latin America. By comparison, the disparity in average income level between urban and rural residents in the developing world is usually less than 4 to 1.

Current telephone systems are expensive to deploy. For example, a typical cellular system that includes a mobile switching center (MSC), a base station controller (BSC), and a home location register/visitor location register (HLR/VLR) can cost over $2.0 million. Moreover, such a system may require a minimum of ten thousand users in order to be economically viable. In many rural areas, the population is not large enough to support the installation of such a system. Further, in many cases, the conditions in which the equipment, e.g., the MSC, BSC, and HLR/VLR, are to be operated are extremely harsh and environmentally challenging. An alternative to such a cellular system can include a wired system, but the costs associated with deploying and maintaining land lines are too high for certain rural areas.

BRIEF DESCRIPTION OF THE DRAWINGS

FIG. 5C illustrates an embodiment of a community distributed mobile architecture (DMA) server register utilized to control wireless communications;

DETAILED DESCRIPTION OF THE DRAWINGS

Figure 1:
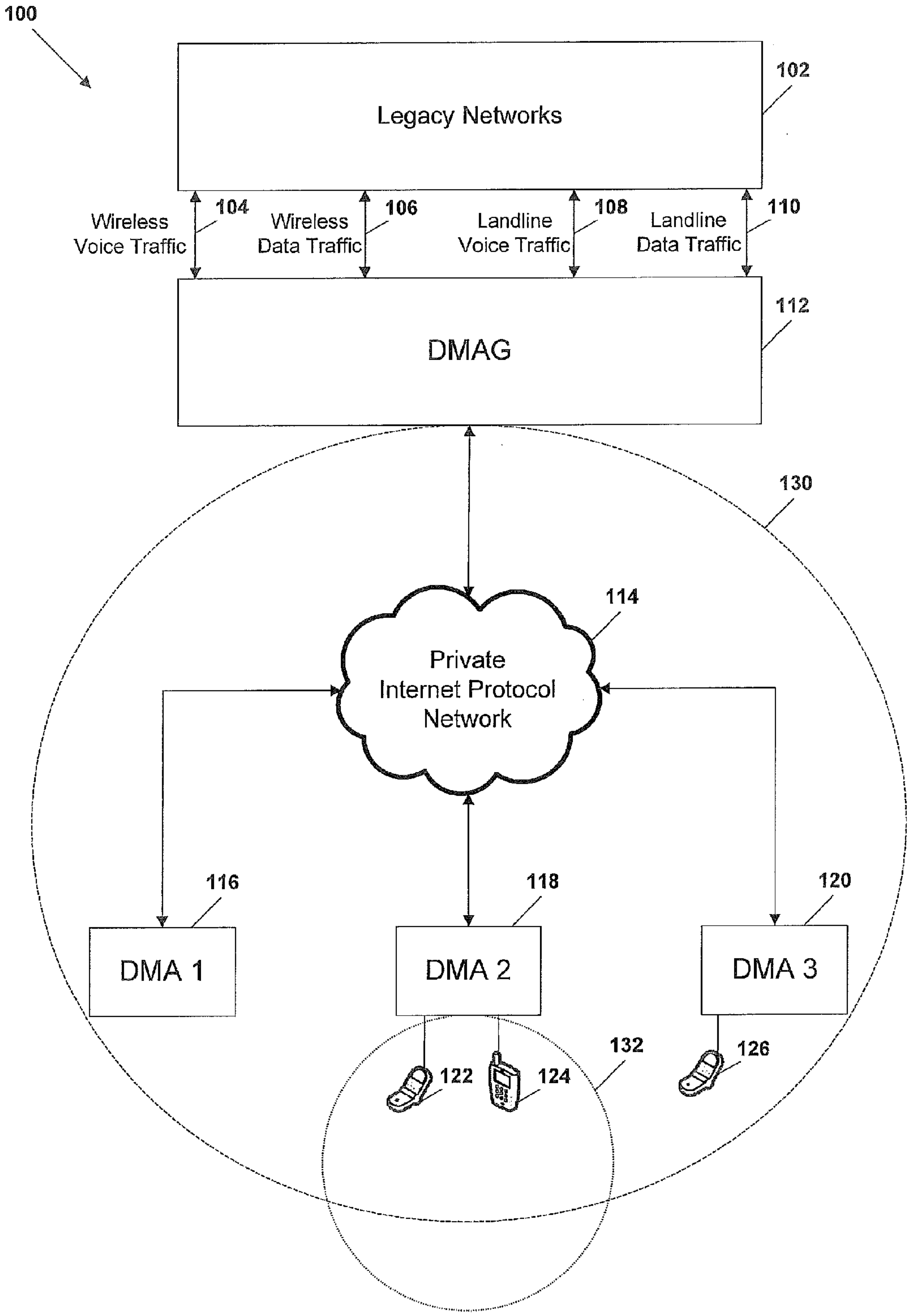
FIG. 1 is a block diagram of an embodiment of a system to control wireless communications.

In a particular embodiment, a network communication system is disclosed that includes a first distributed mobile architecture gateway (DMAG) having a first interface to communicate with a legacy communication network and a second interface to communicate with a private internet protocol (IP) network. The first DMAG also has logic to forward voice traffic received via the first interface to a first distributed mobile architecture (DMA) server via the private IP network. The voice traffic is directed to a wireless communication device associated with the first DMA server and the first DMA server is one of a first plurality of DMA servers designated by a communications service provider to communicate via the first DMAG. Additionally, the first DMAG includes a home distributed mobile architecture server register comprising information related to each of the plurality of DMA servers designated to communicate via the first DMAG and a visitor distributed mobile architecture server register including information related to visitor DMA servers that are temporarily registered with the first DMAG and that are designated to communicate via at least a second DMAG.

In another embodiment, a network communication system is disclosed that includes a distributed mobile architecture (DMA) server coupled to a base transceiver station. The DMA server includes a routing module adapted to receive first voice traffic via a legacy communication network. The first voice traffic is directed to a wireless communication device within a coverage area of the DMA server. The routing module is also adapted to receive first signaling information related to the first voice traffic from a distributed mobile architecture gateway (DMAG) via a private Internet Protocol (IP) network. Further, the routing module is adapted to route the first voice traffic to the wireless communication device via the base transceiver station according to the first signaling information.

In another embodiment, a network communication system is disclosed that includes a plurality of distributed mobile architecture gateways. Each distributed mobile architecture gateway includes at least one interface to communicate with one or more legacy communication networks and each distributed mobile architecture gateway including a data network connection. The data network connection adapted to connect to at least one other distributed mobile architecture gateway of the plurality of distributed mobile architecture gateways. The system also includes a private Internet Protocol (IP) network connecting each distributed mobile architecture gateway to a respective set of distributed mobile architecture (DMA) servers. Each DMA server is coupled to a respective base transceiver station, and the private IP network also connects each DMA server in a particular set of DMA servers to the DMA servers in the other sets of DMA servers.

A method of routing calls via a communications network is disclosed that includes receiving a call at a first distributed mobile architecture gateway (DMAG) via a legacy communication network, where the voice traffic is placed to a first wireless communication device. The method also includes identifying that the first wireless communication device is adapted to communicate via a first DMA server based on wireless communication device registration data stored at the first DMAG. The first DMA server is one of a plurality of DMA servers designated by a communications service provider to communicate via the first DMAG. Further, the method includes routing the voice traffic from the first DMAG to the first DMA server via a private Internet Protocol (IP) network.

In another embodiment, a method of routing calls via a communications network is disclosed that includes receiving first voice traffic at a first distributed mobile architecture (DMA) server from a first wireless communication device via a base transceiver station integrated with the first DMA server. The first DMA server is adapted to receive the first voice traffic while being transported from a first location to a second location. In addition, the method includes forwarding first packet data related to the first voice traffic over a private internet protocol (IP) network to a distributed mobile architecture gateway (DMAG), where the first voice traffic is directed to a destination device that is accessible via a legacy communication network.

Referring to FIG. 1, a system to control wireless communications is shown and is generally designated 100. The system 100 includes one or more legacy networks 102 coupled to a distributed mobile architecture gateway (DMAG) 104. The one or more legacy networks 102 may include one or more wide-area wireless communication networks, one or more landline communication networks, one or more local area networks (LANs), one or more wireless local area networks (WLANs), or any combination thereof. In an illustrative, embodiment, one or more wide-area wireless communication networks may carry voice traffic 104, data traffic 106, or any combination thereof. For example, the wireless voice traffic 104 may be carried over a Global System for Mobile Communications (GSM) network, a Code Division Multiple Access (CDMA) network, a Time Division Multiple Access (TDMA) network, a Universal Mobile Telecommunications System (UMTS) network, a Personal Communications Service (PCS) network, or any combination thereof. Signaling related to the wireless voice traffic 104 may be carried over a Signaling System 7 (SS7) network and utilize an American National Standards Institute (ANSI) 41 protocol, a Mobile Application Part (MAP) protocol, or a Customized Application of Mobile Enhanced Logic (CAMEL) protocol. The wireless data traffic 106 may be carried over a General Packet Radio Service (GPRS) network, an enhanced GPRS (EG-PRS) network, an IEEE 802.16 network, a UMTS network, a High Speed Packet Access (HSPA) network, or any combination thereof. The wireless data traffic 106 may be formatted according to Internet Protocol (IP). Additionally, wireless voice traffic may be carried over a wireless data traffic connection 104 using a mobile Voice over Internet Protocol (VoIP) technology.

One or more landline communication networks may carry voice traffic 108, data traffic 110, or any combination thereof. The one or more landline communication networks may carry landline voice traffic 108 over a Public Switched Telephone Network (PSTN), an Integrated Services Digital Network (ISDN), or any combination thereof. Signaling related to the landline voice traffic 108 may be carried over an SS7 network and utilize an Integrated Service Digital Network User Part (ISUP) protocol. The landline data traffic 110 may be carried over a Digital Subscriber Line (DSL) network, an Asynchronous Transfer Mode (ATM) network, an optical fiber network, a coaxial cable network, or any combination thereof. Landline voice traffic may also be carried over a landline data traffic connection 110 using Voice over Internet Protocol (VoIP). The landline data traffic 110 may also be formatted according to Internet Protocol (IP).

The legacy networks 102 communicate the wireless voice traffic 104, the wireless data traffic 106, the landline voice traffic 108, the landline data traffic 110, or any combination thereof, to the DMAG 112. The DMAG 112 is adapted to route voice traffic and data traffic between the one or more legacy networks 102 and one or more wireless communication devices, such as the wireless communication devices 122, 124 via a private Internet Protocol (IP) network 114. The private IP network 114 may include a landline IP network, a wireless IP network, or any combination thereof.

The DMAG 112 routes voice traffic and data traffic between the one or more legacy networks 102 and one or more wireless communication devices via one or more distributed mobile architecture (DMA) servers, such as the first DMA server 116, the second DMA server 118, and the third DMA server 120. For example, the DMAG 112 may route voice traffic and data traffic between the one or more legacy networks 102 and the first wireless communication device 122 and the second wireless communication device 124 via the second DMA server 118. The DMAG 112 may also route voice traffic and data traffic between the one or more legacy networks 102 and the third wireless communication device 126 via the third DMA server 120.

Additionally, the DMAG 112 may route voice traffic and data traffic between the wireless communication devices 122-126. For example, the DMAG 112 may route voice traffic and data traffic between wireless communication devices served by the same DMA server. To illustrate, the DMAG 112 may route voice traffic and data traffic between the first wireless communication device 122 and the second wireless communication device 124. Further, the DMAG 112 may route voice traffic and data traffic between wireless communication devices served by different DMA servers. In an illustrative example, the DMAG 112 may route voice traffic and data traffic between the first wireless communication device 122 and the third wireless communication device 126.

In a particular embodiment, the DMAG 112 may be associated with a service area 130. The DMAG 130 may control communications of DMA servers located within the service area 130, such as the DMA servers 116-120. The service area 130 may include one or more wireless connections, one or more wireline connections, or any combination thereof, between the IP network 114 and the DMAG 112, between the DMA servers 116-120 and the DMAG 112, or any combination thereof. Although the service area 130 is shown in FIG. 1 with a particular shape and a particular size, the service area 130 may be a different shape and a different size than the shape and size shown in FIG. 1.

In an illustrative embodiment, a communications service provider may specify that the DMAG 112 is assigned as a primary DMAG to route voice traffic, data traffic, or any combination thereof, related to designated DMA servers. The designated DMA servers may be located within the service area 130 of the DMAG 112 at a given time or the designated DMA servers may be located outside of the service area 130 at a given time. Additionally, the DMAG 112 may route voice traffic, data traffic, or any combination thereof, related to DMA servers that have roamed into the coverage area 130. A particular DMA server may be considered roaming with respect to the DMAG 112 when an additional DMAG (not shown) is designated as the primary node to route communications related to the particular DMA server and the particular DMA server moves out of the coverage area of the additional DMAG and into the coverage area 130 of the DMAG 112. For example, the DMAG 112 may serve as the primary node to route communications related to the first DMA server 116 and the second DMA server 118, while the third DMAG 120 has roamed into the coverage area 130.

Each of the DMA servers 116-120 are adapted to route voice traffic, data traffic, or any combination thereof, related to wireless communication devices served by the respective DMA server. For example, the DMA servers 116-120 may be adapted to route voice traffic and data traffic between wireless communication devices served by the same DMA server. To illustrate, the second DMA server 118 may route voice traffic and data traffic between the first wireless communication device 122 and the second wireless communication device 124. Additionally, the DMA servers 116-120 may be adapted to route voice traffic and data traffic between wireless communication devices served by different DMA servers. In an example, the second DMA server 118 and the third DMA server 120 may route voice traffic and data traffic between the first wireless communication device 122 and the third wireless communication device 126.

In a particular embodiment, the second DMA server 118 may be associated with a service area 132 and the second DMA server 118 may route communications associated with wireless communication devices located within the service area 132, such as the wireless communication devices 122, 124. The service area 132 may include one or more wireless connections to the wireless communication devices 122, 124, such as a long range wireless connection or a short range wireless connection. Although the service area 132 is shown in FIG. 1 with a particular shape and a particular size, the service area 132 may be a different shape and a different size than the shape and size shown in FIG. 1.

A communications service provider may specify that each of the DMA servers 116-120 may be assigned to serve as a primary DMA server for routing communications related to designated wireless communication devices. For example, the second DMA server 118 may serve as the primary DMA server for the first wireless communication device 122. The first wireless communication device 122 may be located within the service area 132 of the second DMA server 118 at a given time or the first wireless communication device 122 may be located outside of the service area 132 at a given time. Additionally, the second DMA server 118 may route voice traffic, data traffic, or any combination thereof, related to wireless communication devices that have roamed into the coverage area 132. A particular wireless communication device, such as the second wireless communication device 124, may be considered roaming with respect to the second DMA server 118 when an additional DMA server, such as the first DMA server 116, is designated as the primary node to route communications related to the particular wireless communication device and the particular wireless communication device moves out of the coverage area of the additional DMA server and into the coverage area 132 of the second DMA server 118.

Each of the DMA servers 116-120 may be adapted to send and receive communications related to wireless communication devices within the respective coverage area of the particular DMA server via one or more base transceiver stations (not shown) coupled to the particular DMA server. A particular DMA server may be coupled to a base transceiver station via a wireline connection or a wireless connection. Additionally, the one or more base transceiver stations may be coupled to one or more antennas (not shown), such as a directional antenna.

Figure 2:
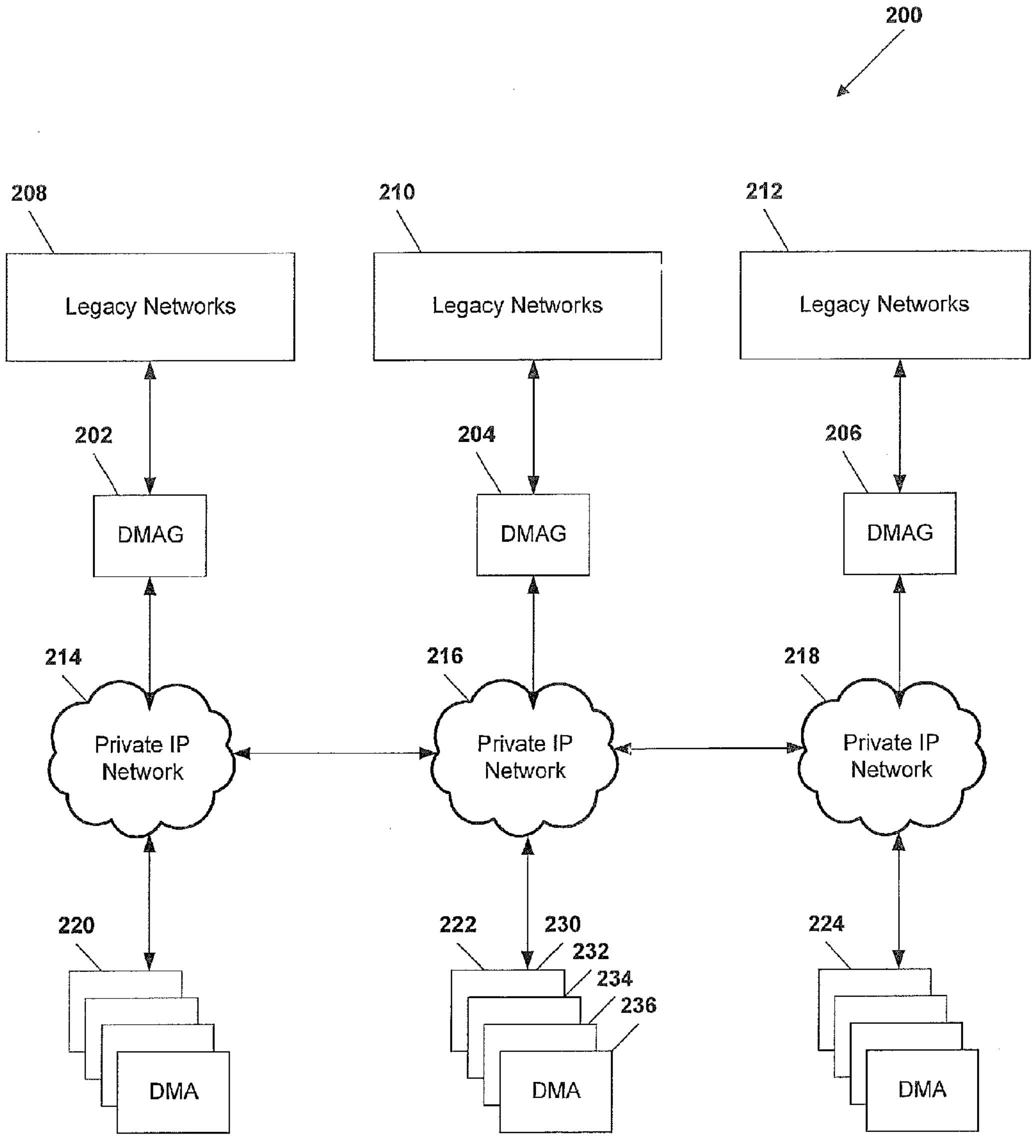
FIG. 2 is a block diagram of a second embodiment of a system to control wireless communications.

Referring to FIG. 2, a second embodiment of a system to control wireless communications is illustrated and generally designated 200. The system 200 includes distributed mobile architecture gateways (DMAGs) 202-206. Each of the DMAGs 202-206 is coupled to one or more legacy networks. For example, the first DMAG 202 is coupled to one or more legacy networks 208, the second DMAG 204 is coupled to one or more legacy networks 210, and the third DMAG 206 is coupled to one or more legacy networks 212. Each of the legacy networks 208-212 may include one or more landline networks, one or more wireless networks, or any combination thereof, to carry voice traffic and/or data traffic to the DMAGs 202-206. Although the legacy networks 208-212 are shown as separate boxes, the legacy networks 208-212 may include one or more of the same legacy networks. Alternatively, each of the DMAGs 202-208 may serve as a backhaul to different legacy networks. To illustrate, the one or more legacy networks 208 may include legacy landline voice and data networks, the one or more legacy networks 210 may include a particular wireless voice and data network, such as a time division multiple access (TDMA) network, and the one or more legacy networks 212 may include another wireless voice and data network, such as a code division multiple access (CDMA) network.

Each of the DMAGs 202-206 may communicate via a private Internet Protocol (IP) network, such as the private IP networks 214-218. The DMAGs 202-206 may communicate with each other via the private IP networks 214-218, with one or more groups of distributed mobile architecture (DMA) servers 220-224, or any combination thereof. Although the private IP networks 214-218 are shown in FIG. 2 as separate networks, the private IP networks may represent either separate private IP networks or a single private IP network.

In a particular embodiment, the first DMAG 202 controls communications related to the first group of DMA servers 220 via the first private IP network 214. Additionally, the second DMAG 204 controls communications related to the second group of DMA servers 222 via the second private IP network 216 and the third DMAG 206 control communications related to the third group of DMA servers 224 via the third private IP network 218. Each of the DMA servers in a respective group of DMA servers may communicate with one or more wireless communication devices (not shown).

Each of the DMAGs 202-206 may control communications related to a respective group of DMA servers by routing voice traffic, data traffic, signaling, or any combination thereof, between the one or more legacy networks 208-212 and one or more wireless communication devices communicating with the respective groups of DMA servers 220-224. In an illustrative embodiment, the second DMAG 204 may be adapted to control communications related to the second group of DMA servers 222 by routing voice traffic, data traffic, signaling, or any combination thereof, between the one or more legacy networks 210 and one or more wireless communication devices registered with the DMA servers 230-236.

In an illustrative embodiment, each DMAG 202-206 may be specified by a communications service provider as a primary node to control voice traffic, data traffic, signaling, or any combination thereof, for designated DMA servers. For example, the second DMAG 204 may serve as a primary node to control voice traffic, data traffic, signaling, or any combination thereof, related to one or more of the DMA servers of the second group of DMA servers 222, such as the DMA servers 230-232. Additionally, the second DMAG 204 may control voice traffic, data traffic, signaling, or any combination thereof, related to one or more of the DMA servers of the second group of DMA servers 222 that have roamed into a coverage area associated with the second DMAG 204, such as the DMA servers 234-236.

Each DMA server of a particular group of DMA servers may be specified as a primary node for controlling communications related to one or more designated wireless communication devices. In addition, each DMA server of a particular group of DMA servers may be adapted to control communications related to one or more wireless communication devices that have roamed into a coverage area of a particular DMA server. Wireless communication devices may roam between DMA servers within a particular group of DMA servers and wireless communication devices may roam between DMA servers included in different groups of DMA servers. In one example, when the DMA server 230 serves as a primary node for a particular wireless communication device, the particular wireless communication device can roam from the coverage area of the DMA server 230 to a coverage area of the DMA server 232. In another example, when the DMA server 230 serves as a primary node for a particular wireless communication device, the particular wireless communication device can roam into a coverage area of a DMA server of the third group of DMA servers 224.

In an illustrative embodiment, a DMA server, such as the DMA server 230 may move from one group of DMA servers, such as the second group of DMA servers 222, to another group of DMA servers, while controlling communications related to one or more wireless communication devices in the coverage area of the DMA server 230. In an example, one or more wireless communications devices in the coverage area of the DMA server 230 when the DMA server 230 is included in the second group of DMA servers 222 may remain within the coverage area the DMA server 230 by moving along with the DMA server 230 to the third group of DMA servers 224. Further, as the DMA server 230 moves to the third group of DMA servers 224, one or more additional wireless communication devices may register with the DMA server 230. In an illustrative, non-limiting embodiment, the second group of DMA servers 222 may be associated with a coverage area of the second DMAG 204 and the third group of DMA servers 224 may be associated with a coverage area of the third DMAG 206.

Each particular DMAG 202-206 may be adapted to route communications, between wireless communication devices in coverage areas of different DMA servers of the respective group of DMA servers associated with the particular DMAG. Additionally, each DMAG 202-206 may be adapted to route communications between wireless communication devices in the coverage area of the same DMA server of the respective group of DMA servers associated with the particular DMAG. In one example, the second DMAG 204 may be adapted to route voice traffic, data traffic, or any combination thereof, between wireless communication devices in the coverage area of the DMA server 230 and wireless communication devices in the coverage area of the DMA server 232. In another example, the second DMAG 204 may be adapted to route voice traffic, data traffic, or any combination thereof, between wireless communication devices in the coverage area of the DMA server 230. Further, the DMAGs 202-206 may be adapted to control communications between wireless communication devices in the coverage area of a DMA server of one group of DMA servers and in the coverage area of another DMA server of a different group of DMA servers. To illustrate, the second DMAG 204 and the third DMAG 206 may be adapted to route voice traffic, data traffic, or any combination thereof, between a wireless communication device in the coverage area of the DMA server 230 and a wireless communication device in the coverage area of a DMA server of the third group of DMA servers 224.

In addition, each DMA server of a particular group of DMA servers may be adapted to route communications locally between wireless communication devices in the coverage area of the respective DMA server. For example, the DMA server 230 may be adapted to control voice traffic, data traffic, or any combination thereof, related to one or more wireless communication devices in the coverage area of the DMA server 230. Further, DMA servers included in a particular group of DMA servers may be adapted to route communications between wireless communication devices in the coverage areas of the DMA servers of the same group of DMA servers. To illustrate, the DMA server 230 and the DMA server 232 may be adapted to control voice traffic, data traffic, or any combination thereof, between wireless communication devices in the coverage area of the DMA server 230 and wireless communication devices in the coverage area of the DMA server 232. Additionally, DMA servers included in different groups of DMA servers may be adapted to route communications between wireless communication devices in coverage areas of the DMA servers included in the different groups. In an example, the DMA server 230 and a particular DMA server of the third group of DMA servers 224 may control voice traffic, data traffic, or any combination thereof, between wireless communication devices in the coverage area of the DMA server 230 and wireless communication devices in the coverage area of the particular DMA server included in the third group of DMA servers 224.

In the event of a failure of a particular DMAG, one or more DMAGs may control communications that would otherwise be controlled by the failed DMAG. In an illustrative embodiment, in the event of a failure of the second DMAG 204, the first DMAG 202, the third DMAG 206, or any combination thereof, may control communications related to the second group of DMA servers 222. For example, the first DMAG 202 and the third DMAG 207 may control voice traffic, data traffic, signaling, or any combination thereof, between the one or more legacy networks 210 and the wireless communication devices in the coverage areas the DMA servers 230-236.

Each of the DMAGs 202-206 may include redundant registration data with respect to each other, in order to assume control of communications in response to a failure in another one of the DMAGs 202-206. The registration data related to a particular DMAG may be redundantly stored in one or more additional DMAGs. In an illustrative, non-limiting embodiment, redundant registration data related to the second DMAG 204 may be stored at the first DMAG 202 and the third DMAG 206.

Registration data may identify that a particular DMAG is specified as the primary node to control communications related to certain DMA servers. In addition, registration data may identify a number of DMA servers that are roaming with respect to a particular DMAG. For example, registration data associated with the second DMAG 204 may identify that the second DMAG 204 is the primary node for the DMA servers 230-232 and that the DMA servers 234-236 are roaming with respect to the DMAG 204. Further, registration data may identify the wireless communication devices that are registered with the DMA servers included in a particular group of DMA servers. To illustrate, registration data associated with the second DMAG 204 may identify that the DMA server 230 is specified to serve as a primary node to control communications related to some wireless communication devices registered with the DMA server 230 and that other wireless communication devices registered with the DMA server 230 are roaming with respect to the DMA server 230. Registration data related to a particular wireless communication device may include an identifier, such as an international mobile subscriber identification (IMSI), associated with the particular wireless communication device. Additionally, the registration data may include further information related to an account associated with a particular wireless communication device.

Additionally, the DMA servers within a particular group of DMA servers may include redundant registration data needed to route communications in response to a failure of a DMA server in the particular group of DMA servers. In an illustrative embodiment, each DMA server of the second group of DMA servers 222 includes registration data identifying one or more wireless communication devices registered with one or more of the other DMA servers in the second group of DMA servers 222. For example, the DMA server 230 may include registration data identifying wireless communication devices in the coverage area of the DMA server 230 and registration data identifying wireless communication devices in the coverage area of the DMA server 232 and in the coverage area of the DMA server 234. Thus, the DMA server 230 can route voice traffic, data traffic, or any combination thereof, of wireless communication devices in the respective coverage areas of the DMA servers 232, 234, if the DMA server 232 and/or the DMA server 234 fails. To illustrate, if the DMA server 232 fails, the DMA server 230 can route communications between the second DMAG 204 and the wireless communication devices in the coverage area of the failed DMA server 232. Additionally, the DMA server 230 can route communications between wireless communication devices in the coverage area of the DMA server 232 at the time of failure. Further, the DMA server 230 can route communications between wireless communication devices in the coverage area of the DMA server 232 and wireless communication devices in the coverage area of other DMA servers of the system 200.

In some embodiments, a communications service provider may specify that one or more of the DMAGs 202-206 are adapted to route voice traffic, data traffic, and signaling related to wireless communication devices served by a particular group of DMA servers. In other embodiments, a communications service provider may specify that a particular DMAG is adapted to route voice and data traffic related to wireless communications devices served by a particular group of DMA servers, while another DMAG is adapted to handle the signaling related to communications associated with wireless communication devices registered with the particular group of DMA servers. In an example, the first DMAG 202 may be adapted to manage signaling related to communications associated with each group of DMA servers 220-224, while the second DMAG 204 and the third DMAG 206 are adapted to control voice traffic and data traffic related to communications associated with each group of DMA servers 220-224.

Figure 3:
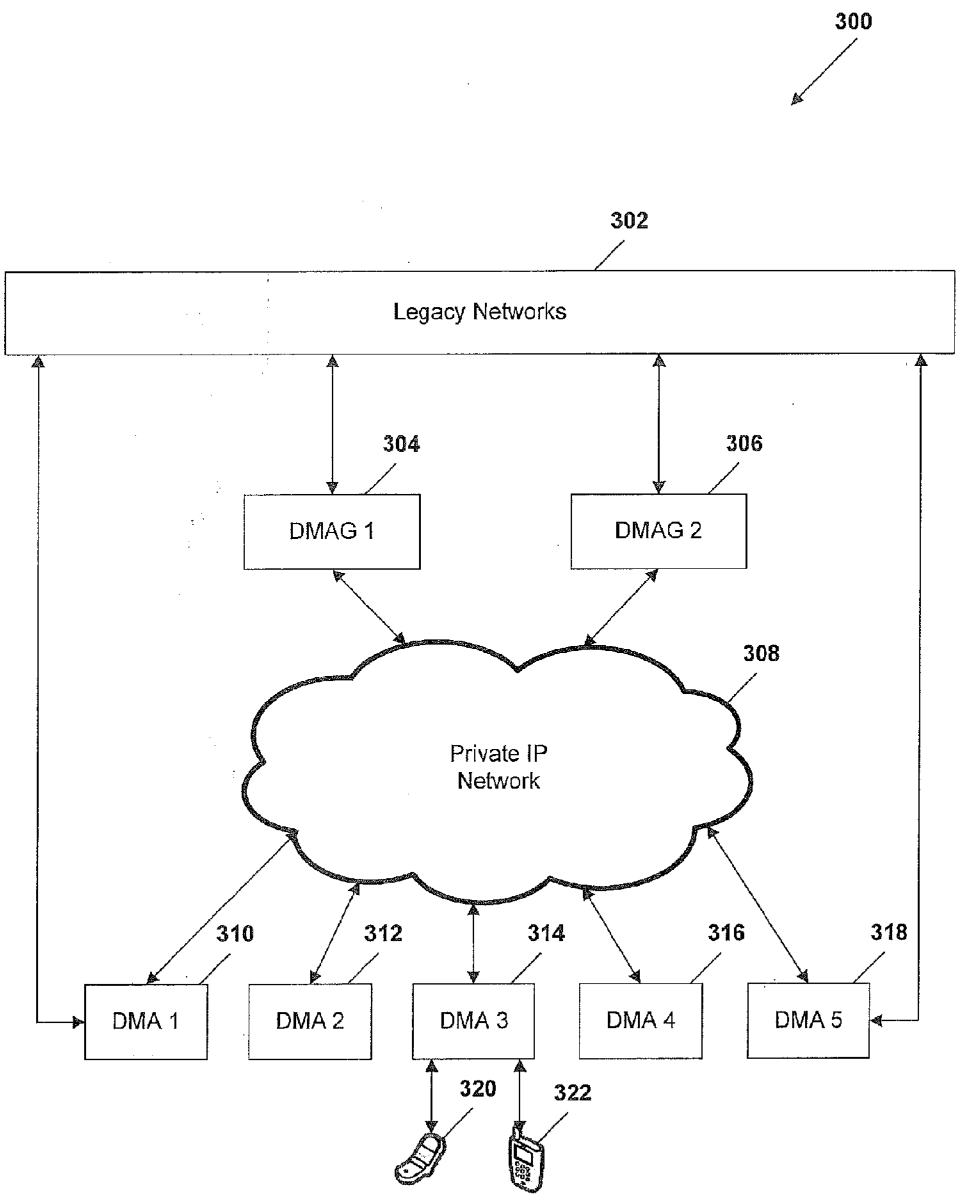
FIG. 3 is a block diagram of a third embodiment of a system to control wireless communications.

Referring to FIG. 3, a third embodiment of a system to control wireless communications is illustrated and generally designated 300. The system 300 includes one or more legacy networks 302, such as one or more landline communication networks, one or more wireless communication networks, or any combination thereof. The legacy networks 302 may communicate voice traffic, data traffic, signaling, or any combination thereof, with one or more distributed mobile architecture gateways (DMAGs) 304, 306, one or more distributed mobile architecture (DMA) servers 310-318, or any combination thereof. Each of the DMAGs 304, 306 may be designated to control communications related to one or more distributed mobile architecture (DMA) servers. For example, the first DMAG 304 may be designated by a communications service provider to control communications related to the first DMA 310, the second DMA 312, and the third DMA 314. Additionally, the second DMAG 306 may be designated to control communications related to the fourth DMA 316 and the fifth DMA 318. The DMA servers 310-318 communicate with the DMAGs 304, 306 via a private Internet Protocol (IP) network 308 and the DMA servers 310-318 communicate with each other via the private IP network 308. Additionally, the first DMAG 304 and the second DMAG 306 communicate with each other via the private IP network 308.

Each of the DMA servers 310-318 may route communications related to one or more wireless communication devices. To illustrate, the third DMA server 314 may control voice traffic, data traffic, or any combination thereof, related to the wireless communication devices 320, 322. The voice traffic and/or data traffic may be associated with the one or more legacy networks 302, a wireless communication device associated with another one of the DMA servers 310, 312, 316, 318, or another wireless communication device associated with the third DMA server 314.

In an illustrative embodiment, the DMAGs 304, 306 may manage voice traffic, data traffic, and signaling related to some of the DMA servers of the system 300, while managing only signaling traffic to other DMA servers of the system 300. For example, the DMAGs 304, 306 may be adapted to manage voice traffic, data traffic, and signaling for the second DMA server 312, the third DMA server 314, and the fourth DMA server 316. In addition, the DMAGs 304, 306 may manage signaling related to the first DMA server 310 and the fifth DMA server 318. Voice traffic and data traffic related to the first DMA server 310 and the fifth DMA server 318 may be communicated directly between the first DMA server 310 and the fifth DMA server 318 and the legacy communication networks 302. Further, when one or more of the DMAGs 304, 306 fail, the first DMA server 310 and the fifth DMA server 318 may be adapted to provide voice traffic, data traffic, signaling, or any combination thereof, between the DMA servers 312-316 and the one or more legacy networks 302. In an illustrative, non-limiting embodiment, the DMA servers 310, 318 may be responsible for controlling all of the voice traffic and data traffic between the DMA servers 310-318 and the one or more legacy networks 302, while the DMAGs 304, 306 are responsible for controlling the signaling associated with the voice traffic and the data traffic between the DMA servers 310-318 and the of more legacy networks.

Figure 4:
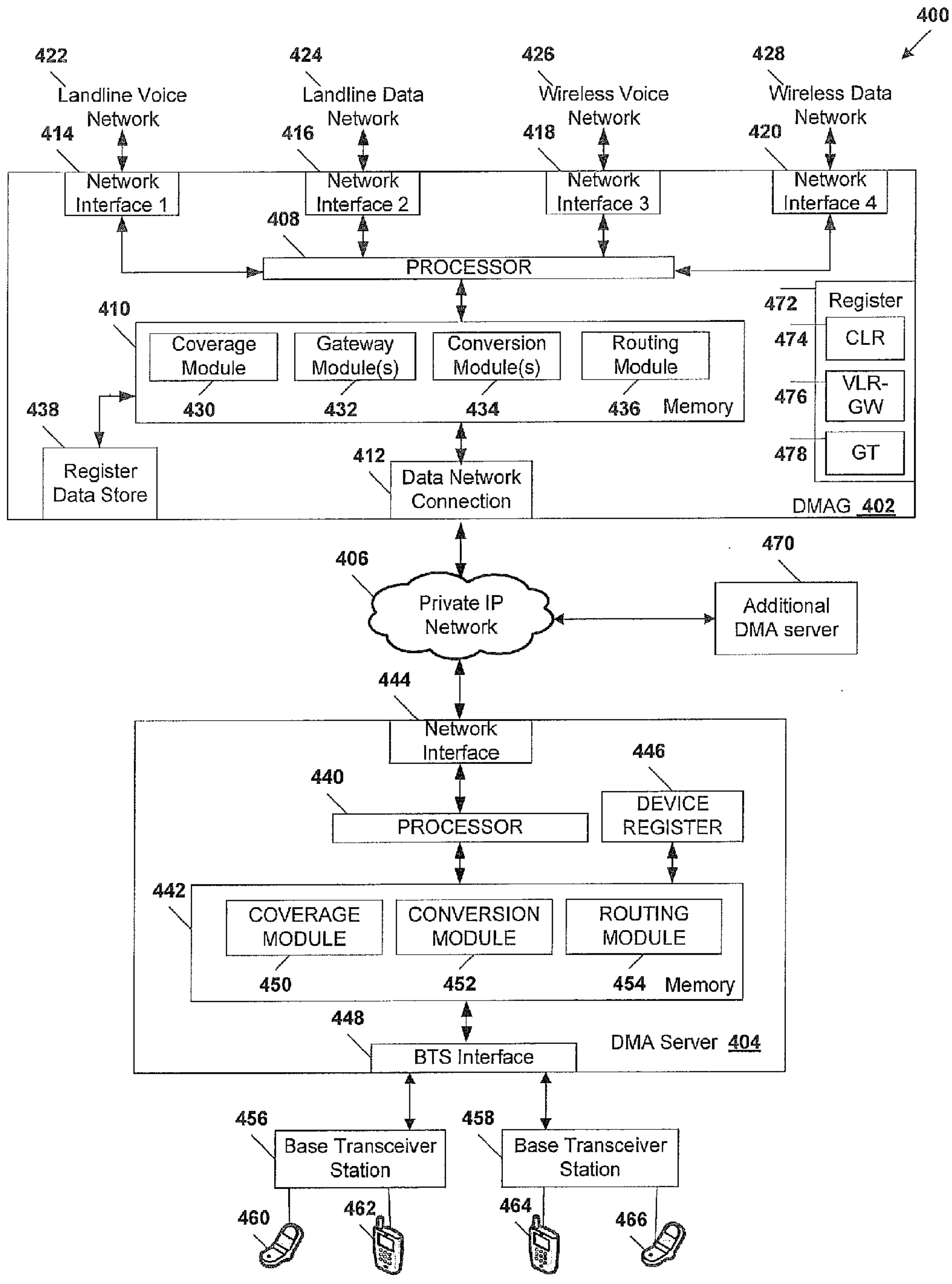
FIG. 4 is a block diagram of a fourth embodiment of a system to control wireless communications.

Referring to FIG. 4, a fourth embodiment of a system to control wireless communications is illustrated and is generally designated 400. The system 400 includes a distributed mobile architecture gateway (DMAG) 402 that communicates with a distributed mobile architecture (DMA) server 404 via a private Internet Protocol (IP) network 406. The system 400 also includes an additional DMA server 470 that is adapted to communicate with the DMAG 402, the DMA server 404, or any combination thereof, via the private IP network 406.

The DMAG 402 includes a processor 408, a memory 410, and a data network connection 412 coupled to the private IP network 406. Additionally, the DMAG 402 includes a first network interface 414, a second network interface 416, a third network interface 418, and a fourth network interface 420. The first network interface 414 is adapted to communicate with a landline voice network 422, such as a Public Switched Telephone Network (PSTN), an Integrated Services Digital Network (ISDN), or any combination thereof. The second network interface 416 is adapted to communicate with a landline data network 424, such as a Digital Subscriber Line (DSL) network, a cable television network, or any combination thereof. The third network interface 418 is adapted to communicate with a wireless voice network 426, such as a Global System for Mobile Communications (GSM) network, a Code Division Multiple Access (CDMA) network, a Time Division Multiple Access (TDMA) network, or any combination thereof. The fourth network interface 420 is adapted to communicate with a wireless data network 428, such as a General Packet Radio Service (GPRS) network, an IEEE 802.16 network, a UMTS network, a High Speed Packet Access (HSPA) network, or any combination thereof.

Signaling received via the first network interface 414 from the landline voice network 422 may relate to Intelligent Network (IN) signaling, such as Signaling System 7 (SS7), and include Integrated Services Digital Network User Part (ISUP) signaling, Message Transfer Part (MTP) signaling, Signaling Control Connection Part (SCCP) signaling, Transaction Capabilities Application Part (TCAP) signaling, Telephone User Part (TUP) signaling, Data User Part (DUP) signaling, or any combination thereof. Further, signaling received via the second network interface 414 from the landline data network 424 related to Voice over Internet Protocol (VoIP) traffic may include session initiation protocol (SIP) signaling, H.323 signaling, or any combination thereof. Additionally, signaling received via the third network interface 418 from the wireless voice network 426 may relate to IN signaling and be formatted according to mobile application part (MAP) protocol, American National Standards Institute (ANSI) 41 protocol, customized application of mobile enhanced logic (CAMEL) protocol, or any combination thereof. Signaling received via the fourth network interface 420 from the wireless data network 428 related to VoIP traffic may include SIP signaling.

Although the landline voice network 422 and the landline data network 424 are shown coupled to separate network interfaces 414 and 416, respectively, the landline voice network 422 and the landline data network 424 may utilize the same infrastructure and be coupled to a single interface. In an illustrative embodiment, the landline voice network 422 and the landline data network 424 may be related to a telephone company communications network that carries voice traffic via a circuit switched PSTN and data traffic via a packet switched DSL network. The DMAG 402 may receive voice traffic and the data traffic from the telephone company communications network at a single interface that separates the voice traffic, the data traffic, signaling information, or any combination thereof.

Further, although the wireless voice network 426 and the wireless data network 428 are shown coupled to separate network interfaces 418, 420, respectively, the wireless voice network 426 and the wireless data network 428 may utilize the same infrastructure and be coupled to a single interface. In an illustrative embodiment, the wireless voice network 426 and the wireless data network 428 may be related to a wireless communications provider network that carries voice traffic via a Global System for Mobile Communications (GSM) network and carries data traffic via a General Packet Radio Service (GPRS) network. The DMAG 402 may receive voice traffic and data traffic from the wireless communications provider network at a single interface that separates the voice traffic, the data traffic, signaling information, or any combination thereof.

The memory 410 includes a coverage module, one or more gateway modules 432, one or more conversion modules 434, and a routing module 436. In one embodiment, each of the modules 430-436 can represent instructions that are executable by the processor 408, such as instructions embodied in one or more software programs stored at the memory 410. In another embodiment, the modules 430-436 can represent hardware, software instructions, or any combination thereof.

The DMAG 402 also includes a register data store 438. The register data store 438 may include one or more databases storing information related to one or more DMA servers. For example, the register data store 438 may include a home DMA server register of the DMAG 402. The home DMA server register of the DMAG 402 may include register information related to one or more DMA servers that are designated by a communications service provider to send and receive communications via the DMAG 402 as the primary node. The register information for a particular DMA server may include an identifier, such as an IP address, other routing data associated with the particular DMA server, connectivity data indicating that the particular DMA server is within a coverage area of a particular DMAG, data indicating that the particular DMA server is offline, or any combination thereof.

The register data store 438 may also include a visitor DMA server register that includes registration information related to DMA servers that have roamed into the coverage area of the DMAG 402. Further, the register data store 438 may include one or more community DMA registers. The one or more community DMA registers may include one or more home DMA server registers and one or visitor DMA server registers of additional DMAGs that are adapted to communicate with the DMAG 402. Examples of the structure of data stores including the register data 436 are shown in FIG. 5 and FIG. 6.

Further, the register data store 438 may include information related to wireless communication devices registered with the DMA servers associated with the DMAG 402. For example, the register data store 438 may include a respective home location register (HLR) associated with each DMA server in the home DMA server register of the DMAG 402, each DMA server in the visitor DMA server register of the DMAG 402, each DMA server in the one or more community DMA registers of the DMAG 402, or any combination thereof. In an illustrative embodiment, the register data store 438 may include an HLR associated with the DMA server 404. The HLR of the DMA server 404 may include wireless communication device registration information related to one or more wireless communication devices that a communications service provider has designated to send and receive voice traffic and/or data traffic via the DMA server 404 as the primary node. The wireless communication device registration information may include an identifier associated with each respective wireless communication device, such as an international mobile subscriber identification (IMSI). Additionally, the wireless communication device registration information may include other routing data associated with the respective wireless communication device, connectivity data indicating that the respective wireless communication device is within a coverage area of a particular DMA server, data indicating that the respective wireless communication device is within a coverage area of a legacy network, or any combination thereof.

Further, the register data store 438 may include a respective visitor location register (VLR) associated with each DMA server in the home DMA server register of the DMAG 402, each DMA server in the visitor DMA server register of the DMAG 402, each DMA server in the one or more community DMA registers of the DMAG 402, or any combination thereof. In an illustrative embodiment, the register data store 438 may include a VLR associated with the DMA server 404. The VLR of the DMA server 404 may include wireless communication device registration information related to one or more wireless communication devices that have roamed into the coverage area of the DMA server 404. The wireless communication devices included in the VLR of the DMA server 404 have been designated by a communications service provider to send and receive voice traffic and/or data traffic via a DMA server other than the DMA server 404, such as the additional DMA server 470, as the primary node.

Further, the register data store 438 may include one or more community location registers (CLRs) associated with each DMA server in the home DMA server register of the DMAG 402, each DMA server in the visitor DMA server register of the DMAG 402, each DMA server in the one or more community DMA registers of the DMAG 402, or any combination thereof. In an illustrative embodiment, the register data store 438 may include one or more CLRs associated with the DMA server 404. The one or more CLRs of the DMA server 404 may include wireless communication device registration information related to one or more wireless communication devices that are included in a home location register of a DMA server other than the DMA server 404, such as the additional DMA server 470. Examples of data structures included in the register data store 438 are shown in FIG. 5 and FIG. 6.

The coverage module 430 is adapted to identify one or more DMA servers that are located within a coverage area associated with the DMAG 402. The DMAG 402 may connect with a particular DMA server in the coverage area of the DMAG 402 via a wireless connection, a wireline connection, or any combination thereof, via the private IP network 406. In one embodiment, the coverage module 430 may identify that a particular computing device has connected to the DMAG 402 via a wireline connection, such as via a Universal Serial Bus (USB) port, and subsequently receive identification information, such as an Internet Protocol address, from the computing device. The coverage module 430 may determine that the identification information indicates that the particular computing device is a DMA server. For example, the coverage module 430 may compare the identification information received from the particular computing device with DMA identification information in the register data store 436. To illustrate, the DMA server 404 may send the DMAG 402 an IP address assigned to the DMA server 404 and the coverage module 430 is adapted to search a home DMA server register stored in the register data store 438, a visitor DMA server register stored in the register data store 438, one more community DMA registers stored in the register data store 438, or any combination thereof, for the IP address received from the DMA server 404.

In another embodiment, the coverage module 430 may be adapted to identify that a particular computing device has connected to the DMAG 402 via a wireless connection, such as a wide area wireless connection or a local area wireless connection. In one example, the coverage module 430 may be adapted to transmit identification signals, such as a location update request via a wireless transceiver (not shown). The identification signals may be adapted to prompt a response in specified devices receiving the identification signals to send identification information to the DMAG 402. In another example, the coverage module 430 may be adapted to wirelessly receive identification information from computing devices in the coverage area of the DMAG 402 without sending the identification signals. The coverage module 430 may determine that identification information received from the particular computing device indicates that the particular computing device is a DMA server. The coverage area of the DMAG 402 may be related to the strength of the identification signals sent from the DMAG 402, the strength of identification information signals received from a computing device, or any combination thereof.

After determining that the DMAG 402 is connected to a particular DMA server, the coverage module 430 may be adapted to register the particular DMA server with the DMAG 402. The coverage module 430 may register the particular DMA server with the DMAG 402 by storing an indication in the register data store 438 specifying that the DMAG 402 is adapted to route voice traffic, data traffic, signaling, or any combination thereof, related to the particular DMA server. The coverage module 430 may store the indication in a home DMA server register of the register data store 438 when a communications service provider has specified that the DMAG 402 is the primary node for routing communications related to the particular DMA server. The coverage module 430 may store the indication in a visitor DMA server register of the register data store 438 when the particular DMA server has roamed into the coverage area of the DMAG 402.

In an illustrative embodiment, the coverage module 430 transmits an identification signal and, in response, receives identification information, such as an IP address, from the DMA server 404. The coverage module 430 may be adapted to establish a connection with the DMA server 404 and the coverage module 430 may be adapted to compare the IP address received from the DMA server 404 with information included in the register data store 438. For example, the coverage module 430 may search a home DMA server register included in the register data store 438. If the IP address of the DMA server 404 is not included in the home DMA server register of the DMAG 404, the coverage module 430 may be adapted to update a visitor DMA server register included in the register data store 438. The coverage module 430 may be adapted to update the visitor DMA server register by adding the IP address of the DMA server 404 to the visitor DMA server register. Additionally, if the IP address of the DMA server 404 is not included in the home DMA server register of the DMAG 404, the coverage module 404 may be adapted to search one or more community DMA registers included in the register data store 438 to identify the additional DMAG that is designated to route communications related to the DMA server 404. The coverage module 430 may also be adapted to send data to the additional DMAG indicating that the DMA server 404 is within the coverage area of the DMAG 402. When the IP address of the DMA server 404 is included in a community The one or more gateway modules 432 may be adapted to distribute voice traffic, data traffic, signaling, or any combination thereof, received via the network interfaces 414-420. In a particular embodiment, each of the network interfaces 414-420 may be associated with a respective gateway module

432. For example, a first gateway module may be adapted to receive voice traffic, signaling, or any combination thereof, from the first network interface 414. The first gateway module may send voice traffic to a corresponding conversion module 434 and send signaling to the routing module 436. Additionally, a second gateway module may be adapted to receive voice traffic, data traffic, signaling, or any combination thereof, from the second network interface 416. The second gateway module may send voice traffic and data traffic to a corresponding conversion module 434 and send signaling to the routing module 436. Further, a third gateway module may be adapted to receive voice traffic, signaling, or any combination thereof, from the third network interface 418. The third gateway module may send the voice traffic to a corresponding conversion module 434 and send signaling to the routing module 436. The one or more gateway modules 432 may also include a fourth gateway module adapted to receive voice traffic, data traffic, signaling, or any combination thereof, via the fourth network interface 420. The fourth gateway module may send voice traffic and data traffic to corresponding conversion modules 434 and send signaling to the routing module 436.

Additionally, the one or more gateway modules 432 may be adapted to receive voice traffic, data traffic, signaling, or any combination thereof, via the data network connection 412, the one or more conversion modules 434, the routing module 436, or any combination thereof. The voice traffic and/or data traffic received at the one or more gateway modules 432 may be intended for a destination device related to the legacy networks 422-428. The one or more gateway modules 432 may identify a particular legacy network that can be utilized to send voice traffic, data traffic, or any combination thereof, to the destination device and route the voice traffic and/or data traffic to the identified legacy network via the corresponding network interface. For example, when a destination device includes a landline telephone, the one or more gateway modules 432 may be adapted to route voice traffic intended for the landline telephone via the first network interface 414.

The one or more conversion modules 432 may be adapted to convert voice traffic, data traffic, or any combination thereof, received via the network interfaces 414-420 to Internet Protocol (IP) for transmission to a destination wireless communication device via the private IP network 406. In addition, the one or more conversion modules 432 may also be adapted to convert voice traffic, data traffic, or any combination thereof, received via the data network connection 412 from IP to another format that is appropriate for a legacy network associated with a destination device related to the voice and/or data traffic. In one example, the one or more conversion modules 432 may include a landline voice network conversion module that is adapted to convert IP data received via the data network connection 412 to a circuit switched analog format that can be transmitted via the landline voice network 422, such as a Public Switched Telephone Network (PSTN). The landline voice network conversion module may also be adapted to convert circuit switched analog data received via the first network interface 414 to IP data. Further, the landline voice network conversion module may compress the IP data associated with the received circuit switched analog data before sending the IP data via the data network connection 412.

Additionally, the one or more conversion modules 432 may include a landline data network conversion module that is adapted to compress IP data received via the second network interface 416. The landline data network conversion module may also decompress IP data received from the data network connection 414 before forwarding the received IP data to a destination device via the second network interface 416. The one or more conversion modules 432 may also include a wireless voice network conversion module that is adapted to convert IP data received via the data network connection 414 to a format that can be transmitted via the wireless voice network 426. For example, the wireless voice network conversion module may convert IP data related to voice traffic received via the data network connection 414 according to Code Division Multiple Access (CDMA), so that the voice traffic can be transmitted to a destination device via the wireless voice network 426. Further, the wireless voice network conversion module may convert voice traffic received via the third network interface 418 to IP for transmission via the data network connection 414.

The wireless voice network conversion module may utilize an Enhanced Variable Rate Vocoder (EVRC) to compress voice traffic received via a CDMA wireless voice network and to decompress voice traffic intended for a destination device accessible via a CDMA wireless voice network that is received via the data network connection 414. In addition, the wireless voice network conversion module may utilize an Adaptive Multi-Rate Speech Codec (AMR) to compress voice traffic received via a Global System for Mobile Communications (GSM) network and to decompress voice traffic received via the data network connection 414 and intended for a destination device accessible via a GSM network.

Additionally, the one or more conversion modules 432 may include a wireless data network conversion module that is adapted to compress IP data received via the fourth network interface 420. The wireless data network conversion module may also decompress IP data received from the data network connection 414 before forwarding the received IP data to a destination device via the fourth network interface 420.

The routing module 434 is adapted to route voice traffic, data traffic, signaling, or any combination thereof, via the data network connection 412, the network interfaces 414-420, or any combination thereof. In a particular embodiment, the routing module 434 is adapted to receive voice traffic, data traffic, or any combination thereof, via the data network connection 412, where the voice traffic and/or data traffic is intended for a particular destination device. The destination device may be accessible via a legacy network or via a DMA server, such as the DMA server 404 or the additional DMA server 470. The routing module 470 may identify the destination device by analyzing routing data associated with the voice traffic and/or data traffic. The voice traffic and/or data traffic received via the data network connection may originate at a wireless communication device associated with a DMA server in the coverage area of the DMAG 404, such as the DMA server 404, the additional DMA server 470, or any combination thereof.

When the routing data indicates that a particular destination device is accessible via the landline voice network 422, the routing module 434 may be adapted to route voice traffic intended for the particular destination device via the first network interface 414. In addition, when the routing data indicates that a particular destination device is accessible via the landline data network 424, the routing module 434 may be adapted to route voice traffic and/or data traffic intended for the particular destination device routed via the second network interface 416. Further, when the routing data indicates that a particular destination device is accessible via the wireless voice network 426, the routing module 434 may be adapted to route voice traffic via the third network interface 418. Also, when the routing data indicates that a particular destination device is accessible via the wireless data network 428, the routing module 434 may be adapted to route voice traffic and/or data traffic via the fourth network interface 420.

Additionally, when the routing data indicates that a particular destination device is accessible via a DMA server, the routing module 434 may be adapted to route voice traffic and/or data traffic via the data network connection 412. The routing module 434 may identify that a destination device is accessible via a DMA server by comparing a destination device identifier, such as an international mobile subscriber identification (IMSI), included in the routing data with wireless communication device identifiers included in the register data store 436. Further, when signaling is required to send voice traffic to a destination device, such as via the landline voice network 422 or the wireless voice network 426, the routing module 434 may be adapted to add signaling to the voice traffic. The signaling added to the voice traffic may be utilized by a signaling network associated with the landline voice network 422 or the wireless voice network 426, such as an SS7 network, to route the voice traffic to a destination device.

The routing module 434 may receive voice traffic, data traffic, or any combination thereof, via the network interfaces 414-420. After receiving voice traffic, data traffic, or any combination thereof, via one of the network interfaces 414-420, the routing module 434 may be adapted to determine a destination device associated with the voice and/or data traffic. In one embodiment, the routing module 434 may be adapted to identify a destination device from signaling associated with voice traffic received from the landline voice network 422 or the wireless voice network 426. In an illustrative, non-limiting embodiment, the routing module 434 may utilize global title translation (GTT) to identify a destination device related to voice traffic received from the landline voice network 422 or the wireless voice network 426. Further, the routing module 434 may identify a destination device related to voice traffic associated with a particular wireless communication device based on identification information received from an additional DMAG (not shown), where the additional DMAG is adapted to control signaling related to voice traffic received from legacy voice networks and the DMAG 402 is adapted to route the corresponding voice traffic received from the legacy voice networks. In another embodiment, the routing module 434 may identify a destination device based on an identifier, such as an IMSI, included in IP data received via the landline data network 424 or the wireless data network 428.

After identifying a destination device related to voice traffic and/or data traffic received via the network interfaces 414-420, the routing module 434 is adapted to determine a routing path for the voice traffic and/or data traffic. The routing module 434 may be determine a routing path for particular voice traffic and/or data traffic by identifying a DMA server that includes the destination wireless communication device within the coverage area of the identified DMA server. For example, the routing module 434 may be adapted to parse the register data store 436 to identify the home location register (HLR) of the respective DMA server that is designated by a communications service provider to route voice traffic, data traffic, or any combination thereof, related to the destination wireless communication device. The routing module 434 may be adapted to determine whether the destination wireless communication device is within the coverage area of the respective DMA server or within a coverage area of another DMA server based on the HLR of the respective DMA server. The routing module 434 may then be adapted to route the voice traffic and/or data traffic to the destination wireless communication device via the appropriate DMA server.

In an illustrative embodiment, the DMAG 404 receives voice traffic and related signaling via the first network interface 414. The routing module 433 may be adapted to identify a destination wireless communication device, such as the wireless communication device 460, for the voice traffic from the signaling. After identifying the destination wireless communication device, the routing module 434 may be adapted to identify a particular DMA server that includes the wireless communication device 460 within the coverage area of the particular DMA server. In an example, the routing module 434 may parse HLRs associated with each DMA server included in the register data store 438. The routing module 434 may determine that the wireless communication device 460 is included in the HLR of the additional DMA server 470 and that the wireless communication device 460 has roamed into the coverage area of the DMA server 404. Thus, the wireless communication device 460 may be included in a visitor location register (VLR) associated with the DMA server 404. Further, the routing module 434 may identify a DMAG that is controlling communications related to the DMA server 404. For example, the routing module 434 may parse a home DMA server register of the DMAG 402 included in the register data store 438, a visitor DMA server register of the DMAG 402 included in the register data store 438, one or more community DMA registers included in the register data store 438. The routing module 434 may determine that the DMA server 404 is within a community DMA register associated with an additional DMAG (not shown) and that the DMA server 404 is included in the visitor DMA server register associated with the DMAG 402 indicating that the DMA server has roamed into the coverage area of the DMAG 402. The routing module 433 may then route the voice traffic to the wireless communication device 460 along the identified routing path.

The DMA server 404 includes a processor 440 and memory 442. In addition, the DMA server 404 includes a network interface 444 coupled to the private IP network 406, a device register 446, and a base transceiver station (BTS) interface 448. The BTS interface 448 is coupled to one or more base transceiver stations, such as the base transceiver station 456 and the base transceiver station 458. The BTS interface 448 may be coupled to the base transceiver stations 456, 458 via a wireless connection or a wireline connection. Each of the base transceiver stations 456, 458 may be adapted to wirelessly transmit and/or receive voice traffic, data traffic, signaling, or any combination thereof, related to one or more wireless communication devices. For example, the base transceiver station 456 may transmit and/or receive communications related to the wireless communication device 460 and the wireless communication device 462 and the base transceiver station 458 may transmit and/or receive communications related to the wireless communication device 464 and the wireless communication device 466.

The memory 442 includes a coverage module 450, a conversion module 452, and a routing module 454. In one embodiment, each of the modules 430-436 can represent instructions that are executable by the processor 408, such as instructions embodied in one or more software programs stored at the memory 410. In another embodiment, the modules 430-436 can represent hardware, software instructions, or any combination thereof.

The device register 446 includes a home location register (HLR) of the DMA server 404, a visitor location register (VLR) of the DMA server 404, one or more community location registers (CLRs) related to one or more additional DMA servers, such as the additional DMA server 470, or any combination thereof. The HLR of the DMA server 404 may include data, such as international mobile subscriber identifications (IMSIs), of one or more wireless communication devices that are designated by a communications service provider to communicate voice traffic, data traffic, signaling, or any combination thereof, via the DMA server 404. The VLR of the DMA server 404 may include data related to one or more wireless communication devices that have roamed into the coverage area of the DMA server 404. Further, each of the one or more CLRs includes data related to one or more wireless communication devices that are designated by a communications service provider to communicate voice traffic, data traffic, signaling, or any combination thereof, via an additional DMA server. For example, the device register 446 may include a CLR having data related to one or more wireless communication devices that are designated to transmit and receive communications via the additional DMA server 470.

In a particular embodiment, the coverage module 450 is adapted to identify one or more wireless communication devices that are within the coverage area of the DMA server 404. For example, the coverage module 450 may be adapted to send paging signals within the coverage area of the DMA server 404 related to requesting identification information related to wireless communication devices that are located within the coverage area of the DMA server 404. To illustrate, the coverage module 450 may transmit an identification information request via the base transceiver station 456, via the base transceiver station 458, or any combination thereof, and receive a response from the wireless communication device 460. The response from the wireless communication device 460 may include identification information associated with the wireless communication device, such as an IMSI. After receiving the identification information from the wireless communication device 460, the coverage module 450 may be adapted to determine if the identification information of the wireless communication device 460 is included in the HLR of the DMA server 404 or within a CLR stored in the device register 446. When the identification information of a wireless communication device is included in a CLR stored in the device register 446, the coverage module 450 may update the VLR of the DMA server 404 to indicate that the wireless communication device has roamed into the coverage area of the DMA server 404. The coverage module 450 may also send data to the DMAG 402, the additional DMA server 470, or any combination thereof, indicating that the wireless communication device 460 is within the coverage area of the DMA server 404.

The memory 442 also includes a conversion module 452 that is adapted to format voice traffic, signaling, or any combination thereof, received via the BTS interface 448 according to Internet Protocol (IP). For example, the conversion module 452 may receive voice traffic and signaling from the wireless communication devices 460-466 that are formatted according to CDMA, GSM, or UTMS and the conversion module may convert the format of the received voice traffic and signaling to IP. In some embodiments, the wireless communication devices 460-466 may transmit voice traffic according to different formats. To illustrate, the wireless communication device 460 may transmit voice traffic according to CDMA, the wireless communication device 462 may transmit voice traffic according to GSM, the wireless communication device 464 may transmit voice traffic according to UMTS, and the wireless communication device 466 may transmit voice traffic according to WiMAX.

Additionally, the conversion module 452 is adapted to convert IP data related to voice traffic and/or data traffic that is received via the network interface 444 to a format that is recognizable by one or more of the wireless communication devices 460-466. For example, the conversion module 452 may be adapted to receive voice traffic intended for the wireless communication device 460 via the network interface 444 from the DMAG 402 or the additional DMA server 470 and format the received voice traffic according to CDMA, GSM, UMTS, or WiMAX depending on the format or formats that can be processed by the wireless communication device 460.

The memory 442 includes a routing module 454 adapted to determine a routing path related to voice traffic, data traffic, signaling, or any combination thereof, received via the BTS interface 448. In a particular embodiment, the routing module 454 receives voice traffic, data traffic, signaling, or any combination thereof, via the BTS interface 448 and identifies a destination device associated with the received communications. The routing module 454 may identify a destination device associated with communications received via the BTS interface 448 by parsing the received communications for a destination device identifier. In one example, voice traffic received via the BTS interface 448 may be associated with signaling that includes an identifier of a destination device, such as an IMSI or a telephone number. In another example, data traffic received via the BTS interface 448 may include packet data including an identifier related to a destination device.

After identifying a destination device associated with communications received via the BTS interface 448, the routing module 454 may determine a routing path for the communications to the destination device. In an illustrative embodiment, the routing module 454 may receive voice traffic from the wireless communication device 460 and determine that the voice traffic is intended for a destination device that is accessible via one of the legacy networks 422-428. For example, the routing module 454 may compare wireless communication device identification information associated with the voice traffic with wireless communication device identification information included in the device register 446. When the wireless communication device identification information associated with the voice traffic is not included in the device register, the routing module 454 may then be adapted to forward the voice traffic to the DMAG 402 via the network interface 444. Further, the routing module 454 may communicate with the DMAG 402 to identify the destination device for the voice traffic. To illustrate, the routing module 454 may forward wireless communication device identification information associated with the voice traffic to the DMAG 402 and receive data indicating whether or not the voice traffic should be routed via the DMAG 402 after the DMAG 402 has parsed the register data store 438 based on the wireless communication device identification information.

In another illustrative embodiment, the routing module 454 may determine that voice traffic received from the wireless communication device 460 is intended for an additional wireless communication device that is accessible via the additional DMA server 470. In one example, the routing module 454 may compare wireless communication device identification information associated with the voice traffic with wireless communication device information included in the device register 446 and determine that the wireless communication device identification information is included in a community location register that includes wireless communication devices designated to communicate via the additional DMA server 470 and that the destination wireless communication device is within the coverage area of the additional DMA server 470. In another example, the routing module 454 may determine that the destination wireless communication device is included in the home location register of the DMA server 404, but that the destination wireless communication device is within the coverage area of the additional DMA server 470.

The routing module 454 may also determine that voice traffic received from the wireless communication device is intended for a wireless communication device that is accessible via the DMA server 404, such as the wireless communication device 464. For example, the routing module 454 may compare wireless communication device identification information associated with the voice traffic to wireless communication device identification information included in the device register 446 and determine that the wireless communication device 464 is included in the home location register of the DMA server 404 or in the visitor location register of the DMA server 404.

Additionally, the routing module 454 may receive data traffic via the BTS interface 448 and identify a destination device related to the data traffic. In one embodiment, the routing module 454 may identify a destination device related to the data traffic that is accessible via the landline data network 424 or the wireless data network 428 and then forward the data traffic to the DMAG 402. For example, the routing module 454 may identify the destination device related to the data traffic based on a destination IP address included in the data traffic or a destination device IMSI included in the data traffic, or any combination thereof. In another embodiment, the routing module 454 may determine that the data traffic is intended for a destination device that is accessible via the additional DMA server 470 or the DMA server 404 by parsing the device register 446 for the destination device identification information.

Further, the routing module 454 may receive packet data related to voice traffic, data traffic, signaling, or any combination thereof, from the DMAG 402, the additional DMA server, or any combination thereof, via the network interface 444. The routing module 454 may be adapted to identify a destination wireless communication device by comparing wireless communication device identification information associated with the packet data with wireless communication device identification information included in the device register 446. For example, the routing module 454 may determine that packet data received via the network interface 444 is intended for the wireless communication device 460 based on an IMSI included in the packet data. After identifying the destination wireless communication device associated with the packet data, the routing module 454 may parse the device register 446 to determine a location of the destination wireless communication device and transmit the packet data to the destination wireless communication device via a base transceiver station that is adapted to communicate with the destination wireless communication device. To illustrate, the routing module 454 may determine that packet data is intended for the wireless communication device 460 and that the wireless communication device 460 is within range to communicate via the base transceiver station 456. The routing module 454 may then be adapted to route have the voice traffic, data traffic, or any combination thereof, related to the packet data to the wireless communication device 460 via the base transceiver station 456.

Figure 5A:
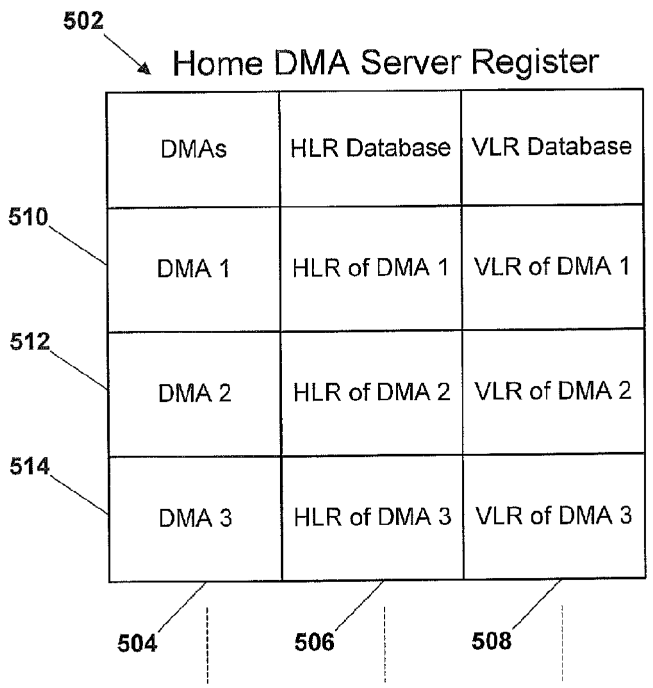
FIG. 5A illustrates an embodiment of a home distributed mobile architecture (DMA) server register utilized to control wireless communications.
Figure 6:
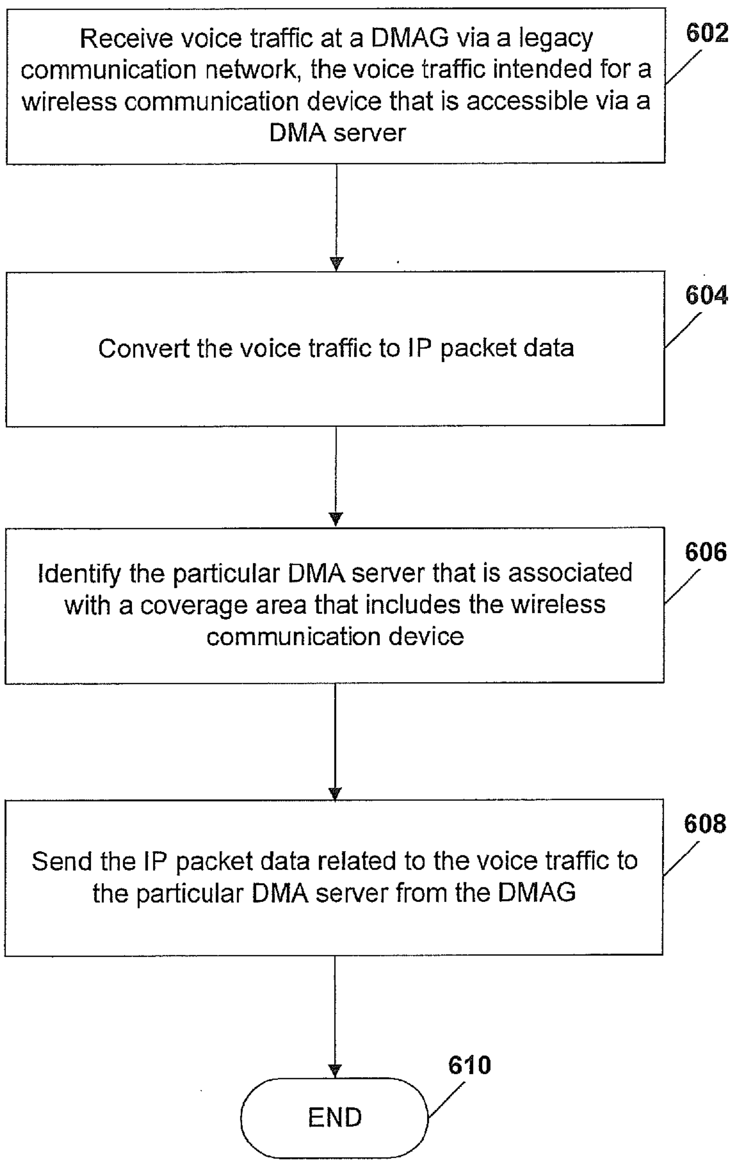
FIG. 6 is a flow diagram of a first embodiment of a method of controlling wireless communications.

FIG. 5A is a diagram of a particular embodiment of a home distributed mobile architecture (DMA) server register 502. The home DMA server register 502 may be associated with a particular distributed mobile architecture gateway (DMAG). The home DMA server register 502 includes information related to one or more DMA servers that have been designated by a communications service provider to send and receive voice traffic, data traffic, signaling, or any combination thereof, via the particular DMAG. The home DMA server register 502 includes information related to a first DMA server at 510, information related to a second DMA server at 512, and information related to a third DMA server at 514.

At 504, the home DMA server register 502 may include identification information, such as an IP address, associated with each DMA server included in the home DMA server register 502. Additionally, at 506, the home DMA server register 502 may include a home location register (HLR) of each DMA server included in the home DMA server register 502. Each HLR may include information related to one or more wireless communication devices designated by a communications service provider to send and receive communications via the DMA server associated with the respective HLR. For example, the HLR of the first DMA server includes information related to each of the wireless communication devices designated by the communications service provider to send and receive communications via the first DMA server. Further, at 508, the home DMA server register 502 may include a visitor location register (VLR) of each DMA server included in the home DMA server register 502. Each VLR may include information related to one or more wireless communication devices that have roamed into the coverage area of the respective DMA server. Although the home DMA server register 502 is shown including information related to three DMA servers, the home DMA server register 502 may include information related to various numbers of DMA servers. Additionally, the home DMA server register 502 may include further information related to each DMA server, such as whether or not a particular DMA server is roaming with respect to the DMAG associated with the home DMA server register.

Figure 5B:
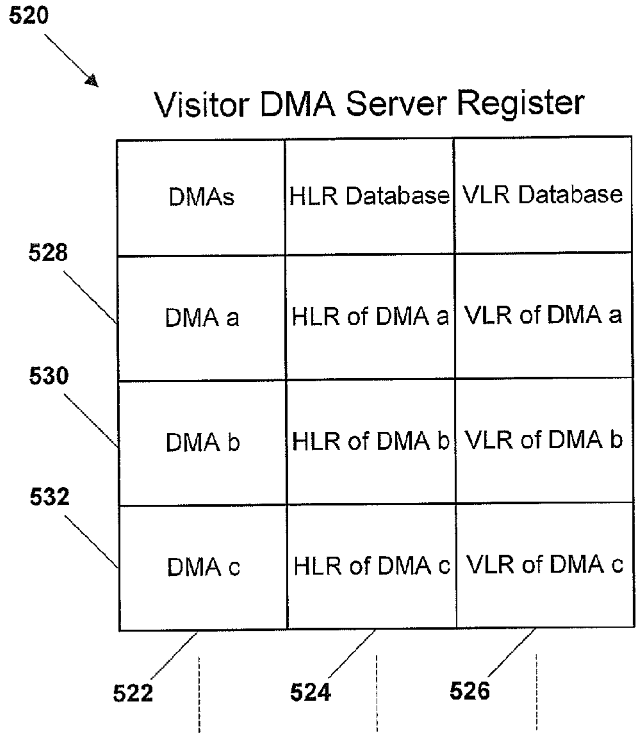
FIG. 5B illustrates an embodiment of a visitor distributed mobile architecture (DMA) server register utilized to control wireless communications.

FIG. 5B is a diagram of a particular embodiment of a visitor distributed mobile architecture (DMA) server register 520. The visitor DMA server register 520 may be associated with a particular distributed mobile architecture gateway (DMAG). The visitor DMA server register 520 includes information related to one or more DMA servers that have been designated by a communications service provider to send and receive voice traffic, data traffic, signaling, or any combination thereof, via a DMAG other than the particular DMAG associated with the visitor DMA server register 520 and that have roamed into the coverage area of the particular DMAG. The visitor DMA server register 520 includes information related to a DMA server a at 528, information related to a DMA server b at 530, and information related to a DMA server c at 532.

At 522, the visitor DMA server register 520 may include identification information, such as an IP address, associated with each DMA server included in the visitor DMA server register 520. Additionally, at 524, the visitor DMA server register 520 may include a home location register (HLR) of each DMA server included in the visitor DMA server register 520. Each HLR may include information related to one or more wireless communication devices designated by a communications service provider to send and receive communications via the DMA server associated with the respective HLR. Further, at 526, the visitor DMA server register 520 may include a visitor location register (VLR) of each DMA server included in the visitor DMA server register 520. Each VLR may include information related to one or more wireless communication devices that have roamed into the coverage area of the respective DMA server. Although the visitor DMA server register 520 is shown including information related to three DMA servers, the visitor DMA server register 520 may include information related to various numbers of DMA servers.

FIG. 5C is a diagram of a particular embodiment of a community distributed mobile architecture (DMA) server register 540. A particular DMAG may include a community DMA server register 540 that includes information related to DMAGs other than the particular DMAG that includes the community DMA server register 540. For example, the community DMA server register 540 includes information related to a first DMAG at 552, information related to a second DMAG at 554, and information related to a third DMAG at 556. At 542, the community DMA server register 540 includes an identifier associated with each DMAG of the community DMA server register 540, such as an IP address. At 544, the community DMA server register 540 includes a home DMA server register related to each DMAG of the community DMA server register 540, such as the home DMA server register 502 of FIG. 5A. In addition, at 546, the community DMA server register 540 includes a visitor DMA server register related to each DMAG of the community DMA server register 540, such as the visitor DMA server register 520 of FIG. 5B. Further, at 548, the community DMA server register 540 includes an HLR associated with each DMA server that is included in the coverage area of the respective DMAG, an HLR associated with each DMA server that is designated by a communications service provider to communicate via the respective DMAG, or any combination thereof. At 550, the community DMA server register 540 includes a VLR associated with each DMA server that is included in the coverage area of the respective DMAG, a VLR associated with each DMA server that is designated by a communications service provider to communicate via the respective DMAG, or any combination thereof. Although the community DMA server register 540 is shown including information related to three DMAGs, the community DMA server register 540 may include information related to various numbers of DMAs.

FIG. 6 is a flow diagram of a method of controlling wireless communications. At 602, a distributed mobile architecture gateway (DMAG) receives voice traffic via a legacy communication network, such as a landline voice network or a wireless voice network. The voice traffic is intended for a wireless communication device that is accessible via a DMA server. Proceeding to 604, the DMAG converts the voice traffic to packet data formatted according to Internet Protocol (IP). Moving to 606, the DMAG identifies the particular DMA server that is associated with a coverage area that includes the wireless communication device. The particular DMA server may be located within a coverage area of the DMAG. The DMAG may identify the particular DMA server by parsing a database that includes a list of wireless communication devices registered with each DMA server in the coverage area of the DMAG. The database may include a home DMA server register, a visitor DMA server register, a community DMA server register, or any combination thereof. Advancing to 608, the DMAG sends the IP packet data related to the voice traffic to the identified DMA server. The method terminates at 610.

Figure 7:
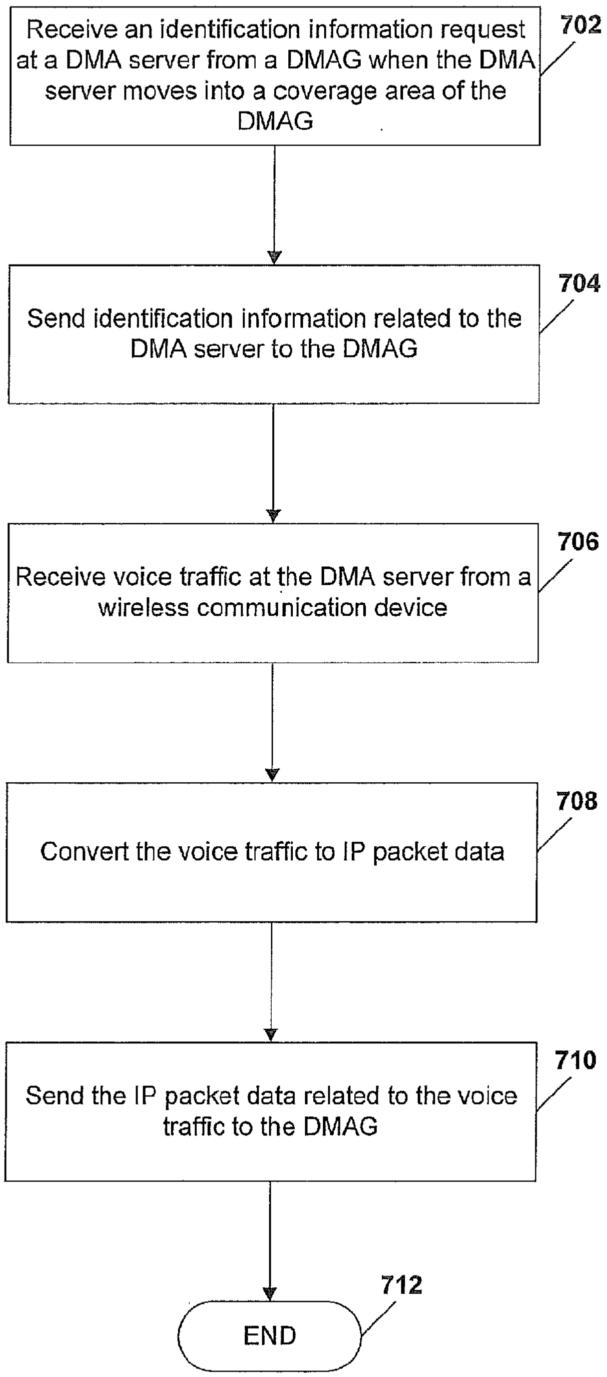
FIG. 7 is a flow diagram of a second embodiment of a method of controlling wireless communications.

FIG. 7 is a flow diagram of a second embodiment of a method of controlling wireless communications. At 702, a distributed mobile architecture (DMA) server receives an identification information request from a distributed mobile architecture gateway (DMAG) when the DMA server moves into a coverage area of the DMAG. Proceeding to 704, the DMA server sends identification information related to the DMA server, such as an IP address, to the DMAG. Moving to 706, the DMA server receives voice traffic from a wireless communication device located in the coverage area of the DMA server.

Advancing to 708, the DMA server converts the voice traffic received from the wireless communication device to packet data formatted according to Internet Protocol (IP). At 710, the DMA server sends the IP packet data related to the voice traffic to the DMAG. The voice traffic may be intended for a destination device accessible via a legacy communication network, a destination device accessible via an additional DMA server, or a destination device accessible with the DMA server. The method terminates at 712.

Figure 8:
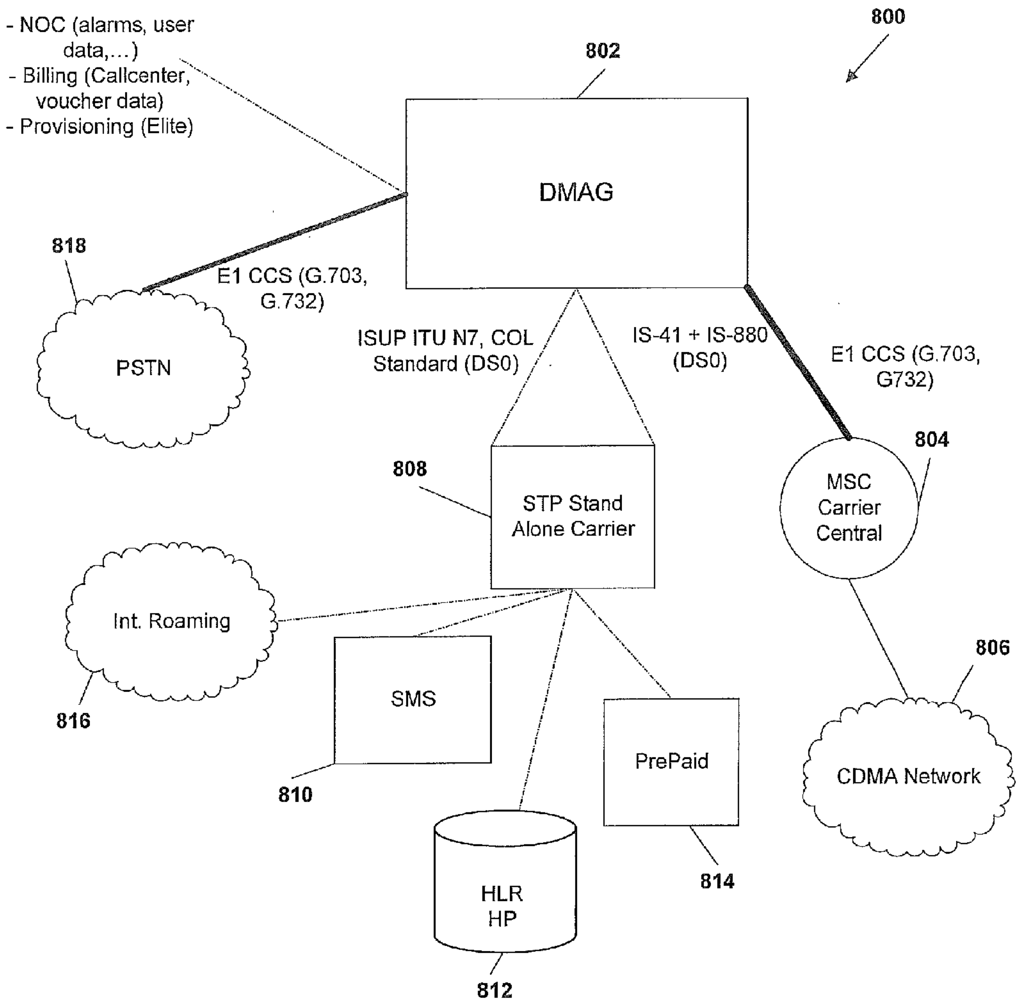
FIG. 8 is a is a block diagram of a fifth embodiment of a system to control wireless communications.

Referring to FIG. 8, a fifth embodiment of a system to control wireless communications is shown and is generally designated 800. As shown, the system 800 includes a distributed mobile architecture gateway (DMAG) 802 that is connected to a wireless carrier's central mobile switching center (MSC) 804. The DMAG 802 may include a DMAG shown in FIGS. 1-4. The DMAG 802 can be connected to the MSC 804 via an E1 common channel signaling (CCS) connection (e.g. G.703, G.732), or any other applicable connection. The MSC 804, in turn, is connected to a code division multiple access (CDMA) network 806. FIG. 8 further shows that the DMAG 802 can be connected to a switching transfer point (STP) 808 of a stand-alone carrier. As shown, the DMAG 802 can be connected to the STP 808 via an IS-41+IS-880 (DS0) connection, or an ISUP internetworking transfer unit (ITU) N7 connection.

As further depicted in FIG. 8, the STP 808 can be connected to a short messaging service (SMS) server 810 in order to provide text-messaging capabilities for the mobile communication devices using the system 800 shown in FIG. 8. Additionally, the STP 808 can be connected to a home location register (HLR) 812, a pre-paid wireless server 814 and an international roaming network 816 in order to provide pre-paid services and roaming between multiple countries. FIG. 8 shows that the DMAG 802 can be connected to the PTSN 818 via an E1 CCS (G.703, G.732) connection, or any other appropriate connection.

Figure 9:
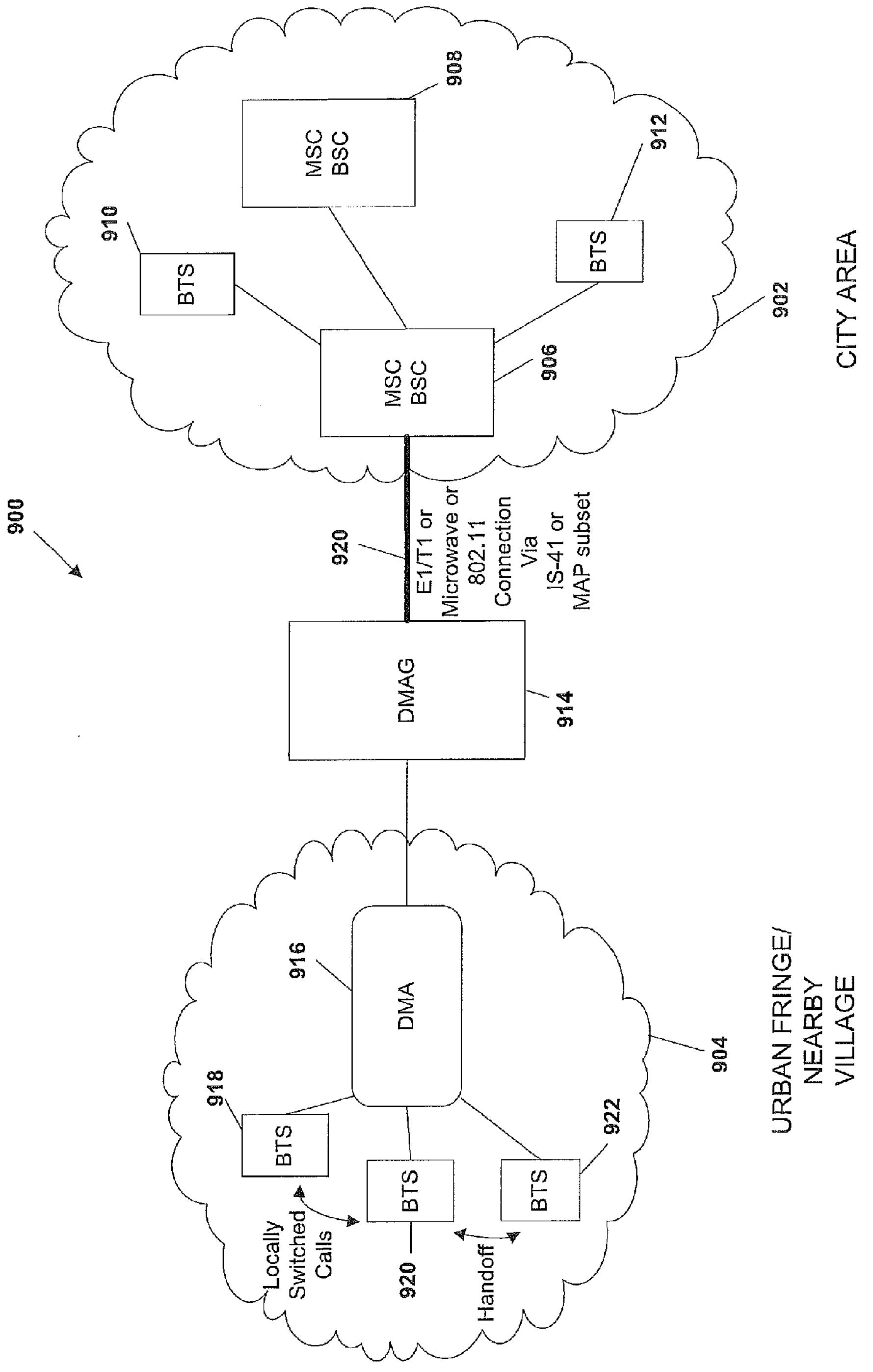
FIG. 9 is a block diagram of a sixth embodiment of a system to control wireless communications.

FIG. 9 is a sixth embodiment of a system 900 to control wireless communications. As shown, the system 900 includes a city area coverage site 902 and an urban fringe/nearby village coverage site 904. In an exemplary, non-limiting embodiment, the city area coverage site 902 includes a first mobile switching center/base station controller (MSC/BSC) center 906 connected to a second MSC/BSC center 908. Also, a first representative base transceiver station (BTS) 910 and a second representative BTS 912 are connected to the first MSC/BSC center 906. The particular deployment of equipment is configured to provide adequate cellular coverage for mobile communication devices within the city area coverage site 902.

As illustrated in FIG. 9, the urban fringe/nearby village coverage site 904 includes a DMA server 914 having a plurality of BTSs 916 connected thereto. The distributed mobile architecture gateway (DMAG) 914 can provide hand-off of calls between the BTSs 916 and can switch calls made between the BTSs 916 locally. However, the DMAG 914 within the urban fringe/nearby village coverage site 904 can also connect telephony traffic to the first MSC/BSC center 906 within the city area coverage site 902 via a data network connection 918. In one embodiment, the data network connection can be an E1 connection, a T1 connection, a microwave connection, or an 802.11 connection established via an IS-41 subset or MAP subset. The deployment of a DMAG 914 in a location such as that described above, i.e., in urban fringe or in a nearby village, and the connection of the DMAG 914 to an MSC/BSC center 906 in a city area, can provide service to potential wireless customers that typically would not receive cellular coverage from the city area cellular coverage site 902. Thus, new subscribers receive access to wireless communication service and can further communicate with wireless customers within the city area cellular coverage site 902.

Figure 10:
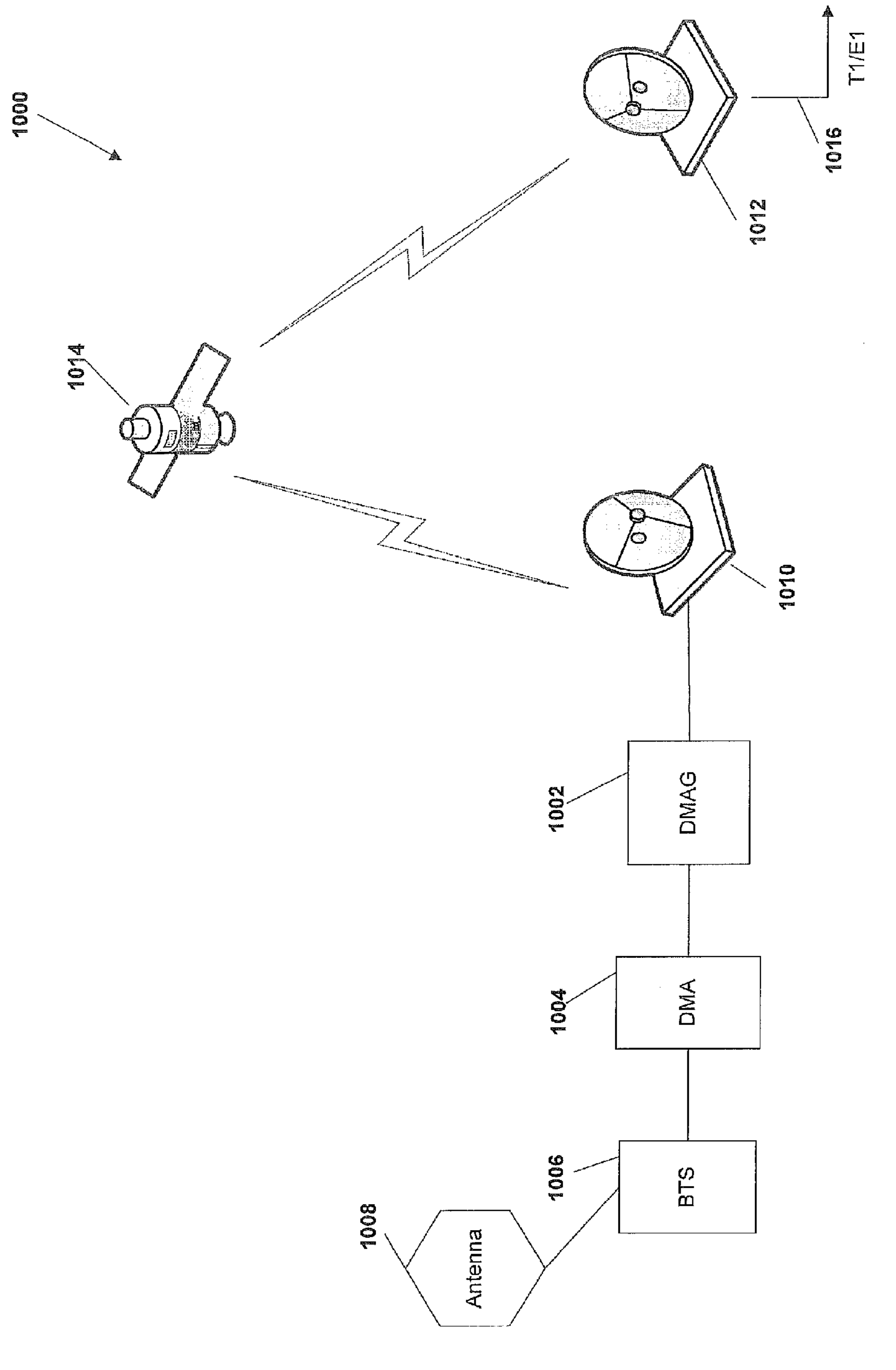
FIG. 10 is a block diagram of a seventh embodiment of a system to control wireless communications.

FIG. 10 is a seventh embodiment of a system 1000 to control wireless communications. As depicted in FIG. 10, the system 1000 includes a distributed mobile architecture gateway (DMAG) 1002 and a distributed mobile architecture (DMA) server 1004 that is connected to a base transceiver station (BTS) 1006. The BTS 1006, in turn, is connected to an antenna 1008. FIG. 10 further illustrates that a first satellite transceiver 1010 is also connected to the DMAG 1002. The first satellite transceiver 1010 communicates with a second satellite transceiver 1012 via a satellite 1014. Additionally, the second satellite transceiver 1012 includes a data network connection 1016, e.g., a T1 connection, or an E1 connection. The satellite transceivers 1010, 1012 and the satellite 1014 can provide a backhaul connection for the DMAG 1002 or the satellite transceivers 1010, 1012 and the satellite 1014 can connect the DMAG 1002 to an additional DMAG (not shown).

Figure 11:
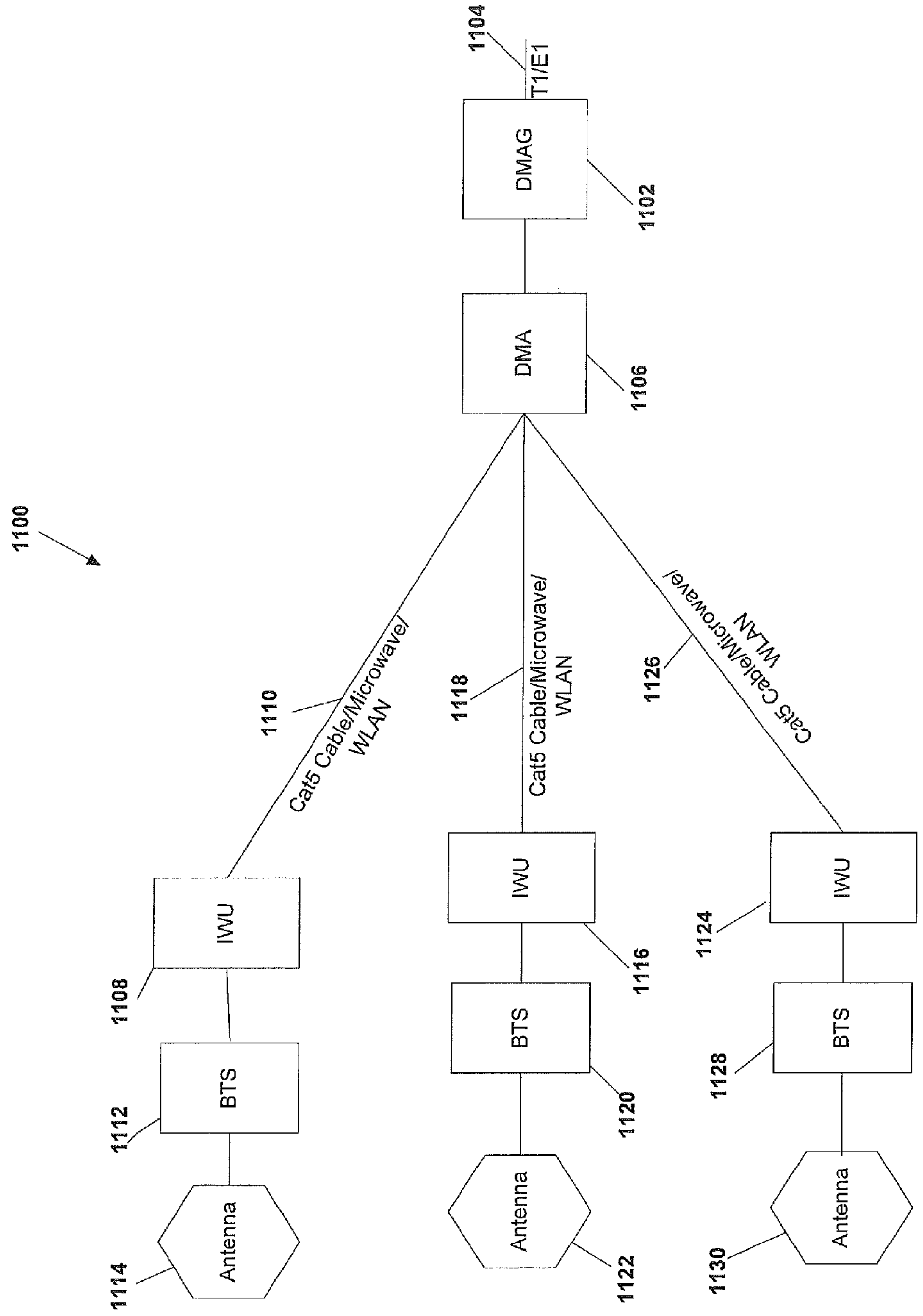
FIG. 11 is a block diagram of an eighth embodiment of a system to control wireless communications.

FIG. 11 is an eighth embodiment of a system 1100 to control wireless communications. As shown, the system 1100 includes a distributed mobile architecture gateway (DMAG) 1102 having a primary network connection 1104 and a distributed mobile architecture (DMA) server 1106. Moreover, the DMAG 1102 can be connected to a plurality of interworking units (IWUs) 1108, 1116, 1124. In an exemplary, non-limiting embodiment, the DMAG 1102 can be connected to each IWU 1108, 1116, 1124 via a respective secondary network connection 1110, 1118, 1126, such as a category five (Cat 5) cable connection, a microwave connection, or a WLAN connection. Further, each IWU 1108, 1116, 1124 is connected to a respective base transceiver station (BTS) 1112, 1120, 1128 and each BTS, in turn, is connected to a respective antenna 1114, 1122, 1130. Each BTS 1114, 1122, 1130 can be a 3-sector BTS. In the deployment depicted in FIG. 11, the DMAG 1102 can act as a centralized micro-switch that can be used to handle telephony traffic received at the antennae 1114, 1122, 1130.

Figure 12:
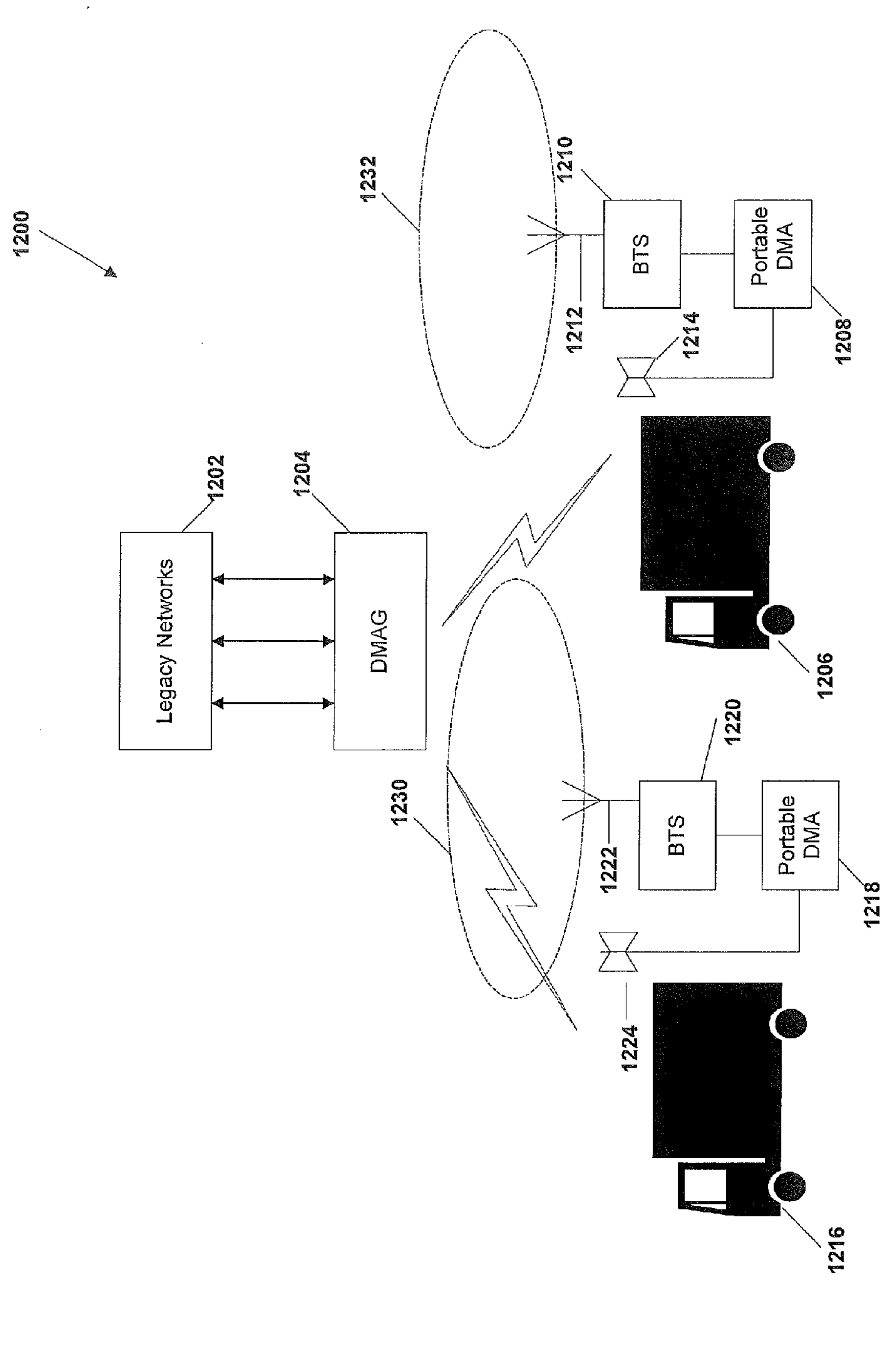
FIG. 12 is a block diagram of a ninth embodiment of a system to control wireless communications.

FIG. 12 is a ninth embodiment of a system 1200 to control wireless communications. As depicted, the system 1200 includes a plurality of mobile cellular coverage sites 1230, 1232. Each mobile cellular coverage site 1230, 1232 includes a respective vehicle 1206, 1216 in which a field distributed mobile architecture (DMA) server 1208, 1218 is disposed. Moreover, a respective base transceiver station (BTS) 1210, 1220 is disposed within each vehicle 1206, 1216 and is in direct physical connection with the field DMA servers 1208, 1218, e.g., by a wire or cable connected there between. The field DMA servers 1208, 1218 and the BTSs 1210, 1220 can be removably installed within the vehicles 1206, 1216 or permanently affixed therein. FIG. 12 further indicates that each BTS 1210, 1220 can include a respective antenna 1212, 1222 that is designed to communicate with mobile communication devices. Also, each field DMA server 1208, 1218 includes a respective antenna 1214, 1224. In an exemplary, non-limiting embodiment, the field DMA servers 1208, 1218 can communicate wirelessly with each other via the antennae 1212, 1222, e.g., via 802.11a, 802.11b, microwaves, or other wireless link.

The mobile cellular coverage sites 1230, 1232 can be deployed to provide a temporary web of cellular coverage for a plurality of mobile communication devices, e.g., devices carried by soldiers during a battle. The mobile in-field communications system 1200 can be recalled, moved, and re-deployed as necessary. Further, the system can include a wireless connection, e.g., 802.11a, 802.11b, microwaves, to the distributed mobile architecture gateway (DMAG) 1204 that is adapted to route communications to and from the legacy networks 1202.

Figure 13:
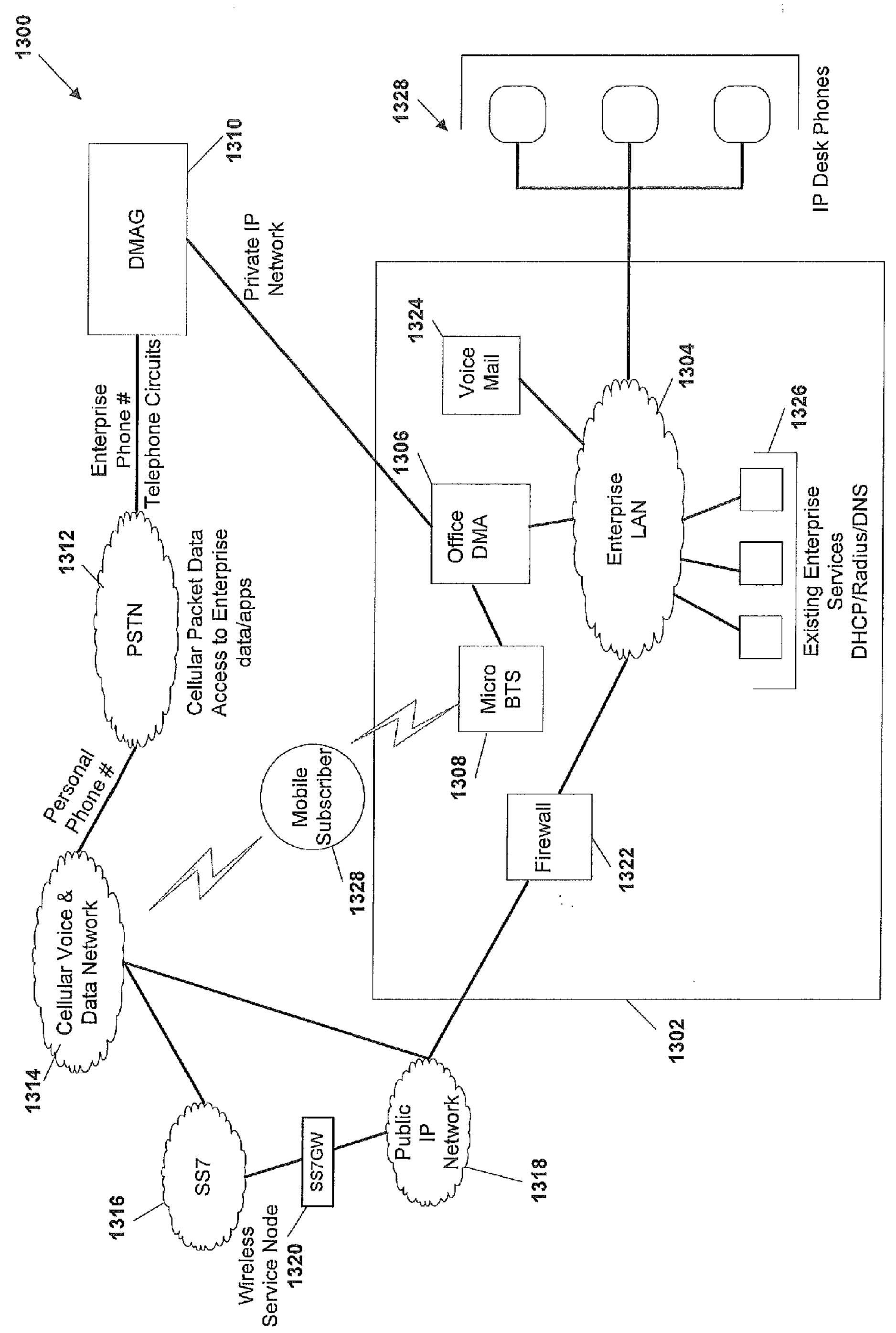
FIG. 13 is a block diagram of a tenth embodiment of a system to control wireless communications.

FIG. 13 is a tenth embodiment of a system to control wireless communications. FIG. 13 depicts a structure 1302, e.g., an office building, a commercial building, a house, etc. An enterprise local area network (LAN) 1304 is installed within the building 1302. A micro-BTS 1308 is connected to the enterprise LAN 1304. Moreover, a voice mail server 1324 and plural enterprise services servers 1326 are connected to the enterprise LAN 1304. In an exemplary, non-limiting embodiment, the enterprise services servers 1326 can include a dynamic host configuration protocol (DHCP) server, a radius server, a domain name server (DNS), etc. As depicted in FIG. 13, a plurality of phones 1328, e.g., IP desk phones, can be connected to the enterprise LAN 1304.

FIG. 13 further indicates that an office DMA server 1306 can be connected to the enterprise LAN 1304. The office DMA server 1306 can also be connected to a distributed mobile architecture gateway (DMAG) 1310 that is coupled to the PSTN 1312. The PSTN 1312 can, in turn, can be connected to a cellular voice and data network 1314. The enterprise LAN 1304 can also be connected to the cellular voice and data network 1314 via an Internet protocol (IP) network 1318. A signaling system seven (SS7) network 1316 can be connected to the cellular voice and data network 1314 and the IP network 1318. FIG. 13 also depicts an SS7 gateway 1320 between the SS7 network 11316 and the IP network 1318. Further, FIG. 13 includes a firewall 1322 between the enterprise LAN 1304 and the IP network 1318. FIG. 13 shows a wireless communication device 1328 in communication with the cellular voice and data network 1314 and the micro-BTS 1308.

With the configuration of structure described above, the present disclosure provides a system and method of controlling wireless communications through use of flexible telecommunications devices, such as the DMA servers and DMAGs shown in FIGS. 1-4 and FIGS. 9-14, that are distributive and associative. That is, the DMA servers and DMAGs can operate stand-alone or seamlessly within an existing cellular or other network. The DMA servers can be integrated with virtually any third party base station. The DMA servers, the DMAGs, or any combination thereof, can provide integrated prepaid billing, OAMP, network management, and AAA functionality. The DMA server and/or the DMAG can include a Java based user interface and feature configuration system and can provide real time call metering, call detail record (CDR) generation, and real time call provisioning. The DMA server may be implemented in a relatively small footprint, such as a footprint the size of a laptop computer, and has a relatively low power requirement. Further, the DMA server and DMAG may be implemented using inexpensive and widely available computer equipment.

With one or more of the deployment configurations described above, the present system provides mobile to landline calls via a DMAG from mobile handsets within a DMA server cellular coverage area. Also, mobile to landline calls via a DMAG can be made from mobile handsets roaming into DMA coverage areas. Mobile to mobile calls can be made from home/roaming handsets to DMA handsets and vice versa. Further, mobile to IP calls and IP to mobile calls can be made from within a DMA server coverage area. IP to IP calls can be made from any DMA handset to any IP phone. Additionally, IP to landline calls and landline to IP calls can be made from a DMA handset to any phone. Further, land-line to mobile calls to DMA handsets can be made.

The systems described above can support call forwarding, call waiting, 3-way calling caller ID, voice mail, and mobile to mobile SMS service, i.e., text messaging. Further, the systems described above can provide broadcast SMS service, mobile to land high-speed IP data (1X or GPRS) service and mobile-to-mobile high speed IP data (1X or GPRS) service. Also, the systems described above can provide IP-PBX capability.

Associated systems can be redundant, self-healing, self-organizing, and scalable. Distributed systems can be "snap-together," i.e., a DMA server can be linked to a previously deployed DMA server and a DMAG can be added to an addition DMAG in order to broaden, or otherwise extend, cellular coverage. Further, distributed systems can be decentralized to avoid single points of failure.

One or more of the systems described above can also provide soft and softer call handoffs on the same frequency interfaces. Also, soft handoffs can be provided on different systems. Further, a DMA based system can operate standalone with a billing system provided by a DMA server and CDR generation. Alternatively, a system can use the SS7 network to pass CDRs to a central switch for integrated billing and operation with an existing network.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of routing calls via a communications network, the method comprising:

receiving first traffic at a first distributed mobile architecture (DMA) server from a first wireless communication device via a base transceiver station integrated with the first DMA server, the first traffic including voice traffic, data traffic, or a combination thereof, wherein the first DMA server is adapted to receive the first traffic while the first DMA server is being transported by a vehicle from a first location to a second location; and forwarding first packet data related to the first traffic over a private interne protocol (IP) network to a distributed mobile architecture gateway (DMAG), wherein the first traffic is directed to a destination device that is accessible via a legacy communication network.

2. The method of claim 1, further comprising receiving second packet data related to second traffic at the first DMA server from the DMAG via the private IP network, the second traffic including second voice traffic, second data traffic, or a combination thereof, Wherein the second voice traffic is directed to the first wireless communication device from a second wireless communication device, wherein the first wireless communication device is within a coverage area of the first DMA server and the second wireless communication device is within a second coverage area of a second DMA server.

3. The method of claim 2, wherein the first DMA server and the second DMA server are designated by a communications service provider to route communications related to the legacy communication network via the DMAG.

4. The method of claim 2, wherein the DMAG is coupled to a second DMAG via the private IP network.

5. The method of claim 1, wherein the legacy communication network comprises a cellular network and the DMAG is coupled to the legacy communication network.

6. The method of claim 1, wherein the DMAG includes a community server register.

7. The method of claim 1, wherein the DMAG is associated with a service area and the first DMA server is located with the service area.

8. The method of claim 7, wherein the DMAG is configured to route voice traffic, data traffic, or a combination thereof associated with other DMA servers that roam into the service area.

9. A network communication system, comprising:

a distributed mobile architecture (DMA) server coupled to a base transceiver station, the DMA server including:

a routing module adapted to:

receive first traffic via a legacy communication network, wherein the first traffic is directed to a wireless communication device within a coverage area of the DMA server, the first traffic including voice traffic, data traffic, or a combination thereof, wherein the DMA server is adapted to receive the first traffic while the DMA server is being transported by a vehicle from a first location to a second location;

receive first signaling information related to the first traffic from a distributed mobile architecture gateway (DMAG) via, a private Internet Protocol (IP) network; and route the first traffic to the wireless communication device via the base transceiver station according to the first signaling information.

10. The system of claim 9, wherein the DMA server is coupled to the base transceiver station via an interworking unit.

11. The system of claim 9, wherein the DMA server is located within a structure and is coupled to an enterprise, local area network located within the structure.

12. The system of claim 11, wherein the DMAG is located outside the structure and is coupled to a public switched telephone network (PSTN).

13. The system of claim 9, wherein the routing module is adapted to:

receive packet data related to second traffic and second signaling information related to the second traffic from the DMAG, the second traffic including second voice traffic, second data traffic, or a combination thereof, wherein the second traffic is directed to the wireless communication device; and route the second traffic to the wireless communication device via the base transceiver station according to the second signaling information.

14. The system of claim 9, wherein the legacy communication network is a cellular network and the DMAG is coupled to the legacy communication network.

15. The system of claim 9, wherein the legacy communication network is a wireline network.

16. The system of claim 9, wherein the legacy communication network includes a wireline network and a wireless network.

17. The system of claim 9, wherein the DMAG includes a community server register.

18. The system of claim 9, wherein the DMAG is coupled to a second DMAG via a private network.

19. A network communication system, comprising:

a plurality of distributed mobile architecture gateways, each distributed mobile architecture gateway including at least one interface to communicate with one or more legacy communication networks and each distributed mobile architecture gateway including a data network connection, the data network connection adapted to connect to at least one other distributed mobile architecture gateway of the plurality of distributed mobile architecture gateways; and a private Internet Protocol (IP) network connecting each distributed mobile architecture gateway to a respective set of distributed mobile architecture (DMA) servers, each DMA server coupled to a respective base transceiver station, wherein the private IP network also connects each DMA server in a particular set of DMA servers to the DMA servers in the other sets of DMA servers, and wherein a first DMA server coupled to a particular distributed mobile architecture gateway is adapted to receive traffic while the first DMA server is being transported by a vehicle from a first location to a second location, the traffic including voice traffic, data traffic, or a combination thereof.

20. The system of claim 19, wherein at least one of the one or more legacy networks is a cellular network.

* * * * *